(12) United States Patent
Moore et al.

(10) Patent No.: US 7,102,643 B2
(45) Date of Patent: Sep. 5, 2006

(54) METHOD AND APPARATUS FOR CONTROLLING THE VISUAL PRESENTATION OF DATA

(75) Inventors: Mike R. Moore, Folsom, CA (US); Kenneth Turcotte, Folsom, CA (US); Mark W. Granger, Placerville, CA (US); Daniel A. Kaye, Folsom, CA (US); Peter A. Tjeerdsma, Fair Oaks, CA (US)

(73) Assignee: Vibe Solutions Group, Inc., St. Louis, MO (US)

( * ) Notice: Subject to any disclaimer, the term of this patent is extended or adjusted under 35 U.S.C. 154(b) by 287 days.

(21) Appl. No.: 10/234,696

(22) Filed: Sep. 4, 2002

(65) Prior Publication Data

US 2003/0090506 A1   May 15, 2003

Related U.S. Application Data

(60) Provisional application No. 60/345,029, filed on Nov. 9, 2001, provisional application No. 60/345,096, filed on Nov. 9, 2002.

(51) Int. Cl.
*G06T 13/00* (2006.01)
(52) U.S. Cl. ............... 345/473; 345/419; 345/619; 715/730; 348/14.01; 348/14.08
(58) Field of Classification Search ................ 345/418, 345/473, 619, 730, 419, 474, 475; 348/594, 348/14.01; 715/730
See application file for complete search history.

(56) References Cited

U.S. PATENT DOCUMENTS

| 5,206,929 A | 4/1993 | Langford et al. |
|---|---|---|
| 5,500,936 A | 3/1996 | Allen et al. |
| 5,640,522 A | 6/1997 | Warrin |
| 5,859,623 A | 1/1999 | Meyn et al. |
| 5,917,480 A | 6/1999 | Tafoya et al. |
| 5,966,121 A | 10/1999 | Hubbell et al. |
| 5,969,716 A | 10/1999 | Davis et al. |

(Continued)

*Primary Examiner*—Kimbinh T. Nguyen
(74) *Attorney, Agent, or Firm*—Thompson Coburn, LLP

(57) ABSTRACT

According to one aspect of the invention, disclosed herein is a method of controlling a visual presentation of data to a viewer, the presentation comprising a plurality of display configuration states through which data content is presented to a viewer, the presentation being responsive to transition input to transition from a current display configuration state to a next display configuration state, the method comprising: (1) providing a plurality of transition effects; (2) for each pair of potentially successive display configuration states, associating a transition effect therewith; (3) receiving transition input indicative to transition from a current display configuration state to a next display configuration state, the transition defining a pair of successive display configuration states; and (4) during the transition from the current display configuration state to the next display configuration state, presenting to the viewer the transition effect associated with the defined pair of successive display configuration states. According to another aspect of the invention, disclosed herein is a method of controlling a visual presentation of data to a viewer, the presentation comprising a plurality of display configuration states through which data content is presented to the viewer, the method comprising: (1) providing a plurality of style guides, each style guide having a plurality of display configuration states corresponding thereto; (2) for each style guide, associating each of its corresponding display configuration states with a plurality of counterpart display configuration states in the other style guides; (3) for a presentation having a previously-defined style guide, selecting a different style guide therefor; and (4) replacing the presentation's display configuration states with their counterparts in the different style guide.

81 Claims, 14 Drawing Sheets

U.S. PATENT DOCUMENTS

| | | |
|---|---|---|
| 6,057,833 A | 5/2000 | Heidmann et al. |
| 6,072,480 A | 6/2000 | Gorbet et al. |
| 6,100,857 A | 8/2000 | Tani et al. |
| 6,115,037 A | 9/2000 | Sumiyoshi et al. |
| 6,177,937 B1 | 1/2001 | Stockham et al. |
| 6,285,381 B1 | 9/2001 | Sawano et al. |
| 6,320,598 B1 | 11/2001 | Davis et al. |
| 6,356,288 B1 | 3/2002 | Freeman et al. |
| 6,369,835 B1 | 4/2002 | Lin |
| 6,373,508 B1 | 4/2002 | Moengen |
| 6,377,282 B1 | 4/2002 | Champion |
| 6,380,950 B1 | 4/2002 | Montgomery et al. |
| 6,381,608 B1 | 4/2002 | Savoie |
| 6,392,665 B1 | 5/2002 | Argabright et al. |
| 6,396,500 B1 | 5/2002 | Qureshi et al. |
| 6,404,747 B1 * | 6/2002 | Berry et al. ................ 370/270 |
| 6,414,686 B1 | 7/2002 | Protheroe et al. |
| 6,414,696 B1 | 7/2002 | Ellenby et al. |
| 6,674,955 B1 * | 1/2004 | Matsui et al. ................ 386/52 |
| 2002/0097258 A1 | 7/2002 | Maymudes et al. |

* cited by examiner

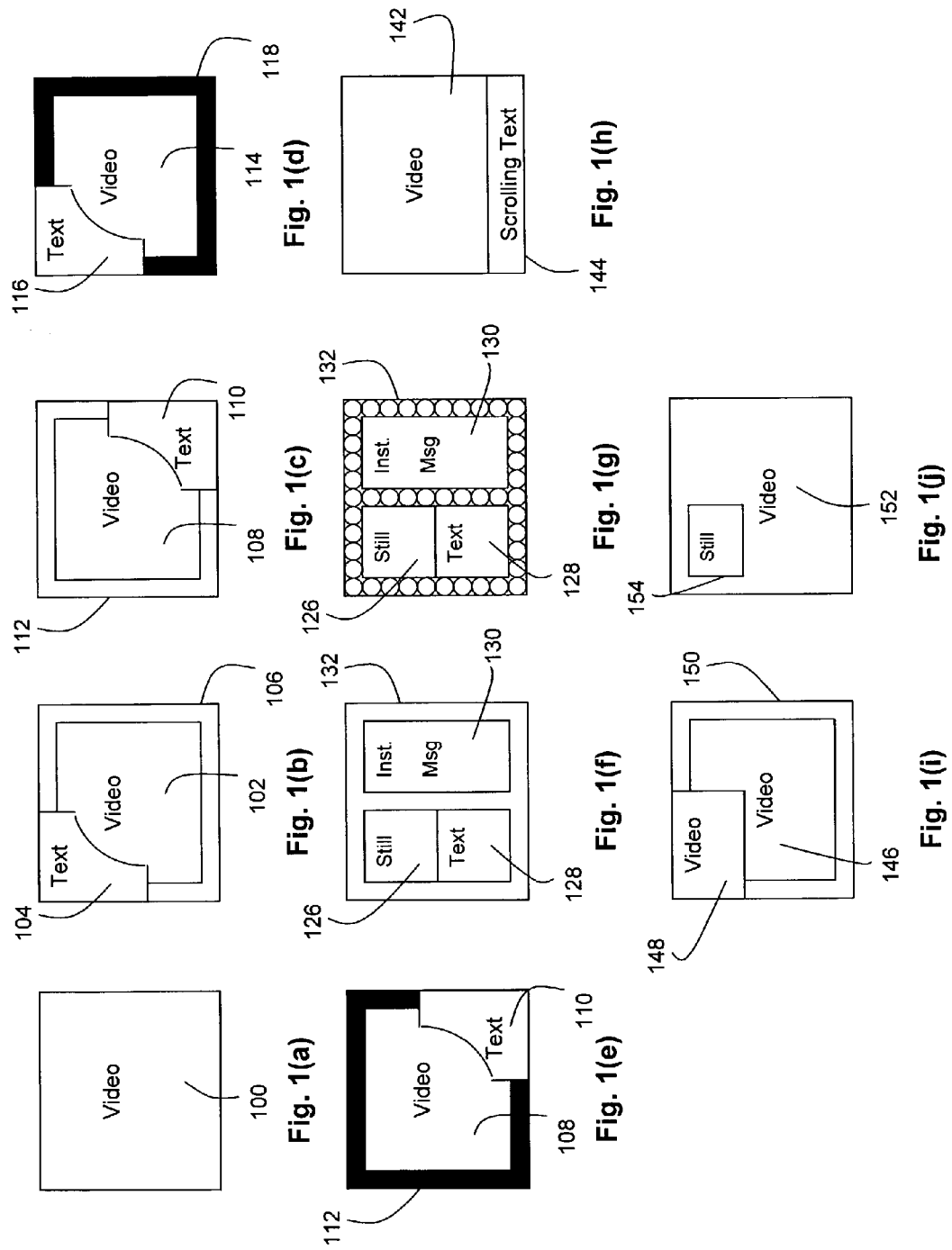

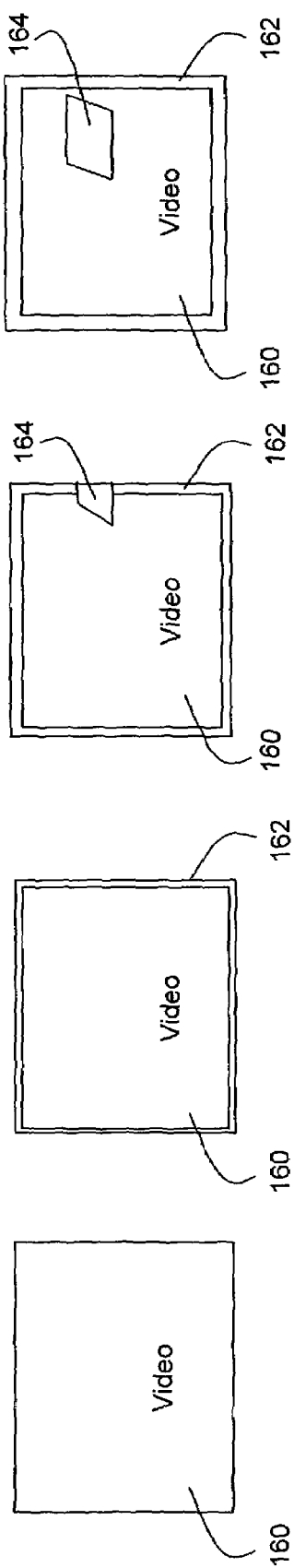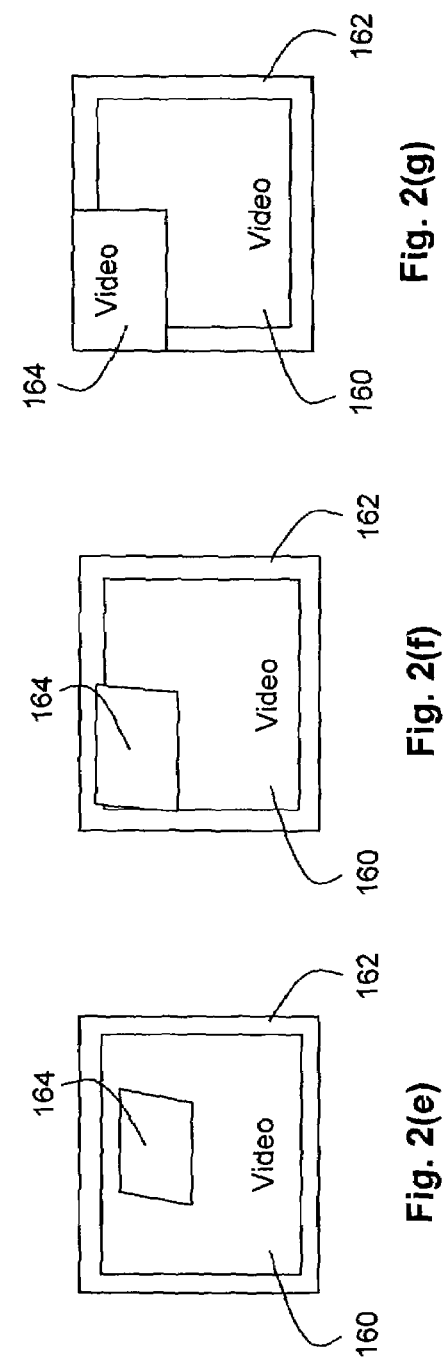

| Next State / Current State | State A | State B | State C | ............. | State n |
|---|---|---|---|---|---|
| State A | Transition Effect 4 | Transition Effect 1 | Transition Effect 6 | ............. | Transition Effect 4 |
| State B | Transition Effect 3 | Transition Effect 1 | Transition Effect 5 | ............. | Transition Effect 2 |
| State C | Transition Effect 3 | Transition Effect 2 | Transition Effect 1 | ............. | Transition Effect 3 |
| ⋮ | ⋮ | ⋮ | ⋮ | ⋮ | ⋮ |
| State n | Transition Effect 4 | Transition Effect 1 | Transition Effect 6 | ............. | Transition Effect 4 |

Figure 3

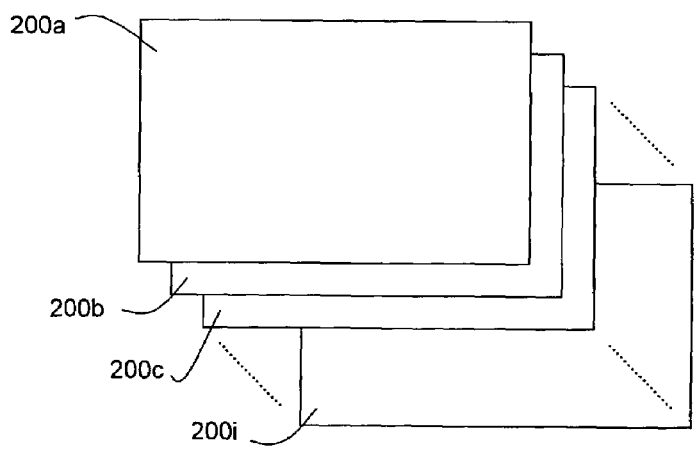

Figure 4

| Style Guide A Aspect: | Style Guide B Counterpart: | Style Guide C Counterpart: |
|---|---|---|
| State 1 | State 1 | State 1 |
| State 2 | State 4 | State 3 |
| State 5 | State 5 | State 6 |
| State 9 | State 17 | State 9 |
| ⋮ | ⋮ | ⋮ |
| State 20 | State 42 | State 13 |

Transition Effect Table for Style Guide A with Common Intermediate State X:

| State: | Transition From: | Transition To: |
|---|---|---|
| State 1 | Transition Effect 1 | Transition Effect 6 |
| State 2 | Transition Effect 23 | Transition Effect 12 |
| State 3 | Transition Effect 5 | Transition Effect 8 |
| ⋮ | ⋮ | ⋮ |
| State n | Transition Effect 13 | Transition Effect 4 |

Figure 17

Intermediate State Table for Style Guide A:

| Next State / Current State | State A | State B | State C | ............... | State n |
|---|---|---|---|---|---|
| State A | State H | State H | State J | ............... | State J |
| State B | State J | State H | State H | ............... | State H |
| State C | State H | State J | State H | ............... | State K |
| ⋮ | ⋮ | ⋮ | ⋮ | ⋮ | ⋮ |
| State n | State K | State H | State H | ............... | State J |

Figure 18

METHOD AND APPARATUS FOR CONTROLLING THE VISUAL PRESENTATION OF DATA

CROSS-REFERENCE AND PRIORITY CLAIM TO RELATED APPLICATIONS

This application claims the benefit under 35 U.S.C. § 119(e) of provisional patent application Ser. No. 60/345,029 entitled "Globally Defined Style Guides", filed Nov. 9, 2001, incorporated by reference herein. This application also claims the benefit under 35 U.S.C. § 119(e) of provisional patent application Ser. No. 60/345,096 entitled "Automatic Selection of Video Transitions", filed Nov. 9, 2002, incorporated by reference herein.

FIELD OF THE INVENTION

The present invention pertains to controlling via computer the visual presentation of data. In particular, the present invention pertains to controlling the transitions between different states of a visual presentation as well as other aspects of a presentation's style.

BACKGROUND OF THE INVENTION

Communication tools that control the visual presentation of data from a presenter to a viewer are known in the art. These communication tools exist in a wide variety of applications, including multimedia slideshow presentations, videoconferences, video phone calls, and video productions—both professional and amateur.

One problem with currently available technology in this field is the skillset required to create high-quality "professional" presentations. Aesthetics play an important role in the effectiveness of such presentations, to capture and hold the viewer's interest. In professional data presentations such as news programs seen on television, highly skilled, trained directors are required to determine and implement the appropriate transition effects displayed to a viewer when the presentation transitions from one camera view to another. Examples of camera views from transitions are made include a close-up of the person reading the news, a view of the person reading the news along with an over the shoulder graphic, a view of the person reading the news with a scrolling text box at the bottom of the screen, a full screen shot of a video clip, and the like. Examples of available transition effects include wipes, dissolves, fades, focuses, flying planes, pushes, pulls, cuts, and the like. An improper selection of the type and timing of the transition effect to be used during a given transition may inadvertently detract from the presentation, giving it an amateurish or unprofessional appearance. Thus, it is important that appropriate transition effects be implemented.

In today's world, many people untrained in the art of directing data presentations are called upon to create and give presentations to audiences of varying sizes. Because it is highly unlikely that such persons have sufficient training or skill so as to make appropriate decisions required to properly implement transition effects, their presentations are unknowingly at risk and might fail for reasons unrelated to the presentation's substantive content. To ensure that the audience focuses on the message of the presentation and not on its production quality, and to possibly even impress the audience with a highly professional production quality, it is important that such unskilled/untrained users have access to a presentation tool that will provide the functionality of a trained and intelligent director.

As an example of a shortcoming indigenous to present prior art multimedia slideshow applications, it is often the case that during a slideshow the presenter will deviate from a planned sequence of slides. With prior art systems, transition effects are pre-selected for the predetermined slide sequence (see, for example, U.S. Pat. No. 5,640,522, the entirety of which is incorporated herein by reference). In such systems, and when the slides are presented out of sequence, either an inappropriate transition effect is displayed (e.g., when the planned transition is from slide 5 to slide 6 with transition effect E to be displayed therebetween, but instead the presenter transitions in an unplanned sequence from slide 5 back to slide 2, transition effect E is displayed even though it is not aesthetically congruous with a slide 5 to slide 2 transition) or an unaesthetic default transition effect is used (e.g., a straight cut). When such "unplanned" and unaesthetic transition effects are displayed during a presentation, especially in the middle of a presentation incorporating aesthetic transitions, the audience's attention often will shift to the inappropriate and many times disruptive transition effect and away from the presenter's message.

Another issue affecting the quality of a presentation is the presentation's style. Style is a wide-ranging concept that encompasses aspects such as the color, shape, and font of any graphical elements displayed during the presentation. It has been found to be desirable for a person creating a presentation to be able to globally define the presentation's style without concerning himself/herself with whether each piece of a presentation fits in with an overall desired style. Further, it has also been found to be desirable to permit the global change of a presentation's style after it or even a part of it has already been created.

For example, if a presenter were to deliver the same presentation to two different audiences that would have two different styles associated therewith (for example, a presentation given to an audience of 7 year old girls and then given to an audience of 7 year old boys), it highly desirable that the presenter be able to globally change the presentation style without being required to laboriously and individually enter stylistic changes to each piece of the presentation.

SUMMARY OF THE INVENTION

In an effort to fill these and other shortcomings in the art, the inventors herein have developed the present invention.

According to one aspect of the invention, in connection with a visual presentation of data comprising a plurality of slides that are successively presented to a viewer, a method is disclosed for transitioning from one presented slide to the next successive slide, the method comprising: (1) for each possible transition from a currently presented slide to a next successive slide, associating a transition effect therewith; and (2) during a transition from a currently displayed slide to a next successive slide, presenting the transition effect associated therewith.

Also disclosed is a method for controlling a visual presentation of data to a viewer, the presentation comprising a plurality of display configuration states through which data content is presented to a viewer, the presentation being responsive to transition input to transition from a current display configuration state to a next display configuration state, the method comprising: (1) providing a plurality of transition effects; (2) for each pair of potentially successive display configuration states, associating a transition effect therewith; (3) receiving transition input indicative of transitioning from a current display configuration state to a next display configuration state, the transition defining a pair of successive display configuration states; and (4) during the transition from the current display configuration state to the next display configuration state, presenting to the viewer the transition effect associated with the defined pair of successive display configuration states.

The visual presentation of the invention can be any variety of presentations wherein data is visually presented to a viewer. A sampling of non-exhaustive examples includes a multimedia slideshow presentation from a presenter to at least one viewer, a videoconference between a plurality of participants, a video phone call between two parties, or a central controller automating a plurality of pieces of video production equipment.

The transition effects are presented during transitions from one display configuration state to another. Preferably, this includes transitions wherein both the current display configuration state and the next display configuration state are the same display configuration state (only the data content would be changing). However, this need not be the case.

The data content presented to the viewer through the display configuration states can be any form of data suitable for visual and/or audio/visual delivery. A non-exhaustive list of examples includes still images, text, graphics (including animated graphics), video clips (from a single source or multiple sources), and audio files.

Further, the transition input for transitioning from a current display configuration state to a next display configuration state can be an input such as a user action (e.g., a mouse click, keyboard entry, voice command, touchscreen command, etc.), a sensed condition (e.g., the passage of time, the detection of a particular party speaking, the detection of motion in a video frame, etc.), or an automated action (such as automatically transitioning out of a state once the state is drawn).

By defining a transition effect for each pair of potentially successive display configuration states, the present invention is able to determine the appropriate transition effect for use in a given situation, even when an unforeseen transition from a current state to a next state occurs. Further, by performing this task transparently to the user, the user does not need the otherwise necessary special training required in the prior art to ensure the proper selection of transition effects.

According to another aspect of the invention, a method is disclosed for controlling a visual presentation of data to a viewer, the presentation comprising a plurality of display configuration states through which data content is presented to the viewer, the method comprising: (1) providing a plurality of style guides, each style guide having a plurality of display configuration states corresponding thereto; (2) for each style guide, associating each of its corresponding display configuration states with a plurality of counterpart display configuration states in the other style guides; (3) for a presentation having a previously-defined style guide, selecting a different style guide therefor; and (4) upon command replacing the presentation's display configuration states with their counterparts in the different style guide.

This feature of the present invention allows a user to initiate fast global style changes.

The present invention is preferably implemented as software stored and executed on a network server accessible by a plurality of viewer or even presenter computers all connected to the network, software stored and executed on an individual or stand alone viewer computer, or software stored and executed on an individual or stand alone presenter computer. The software may be archived on any computer readable medium, such as a CD-ROM, hard disk drive, etc.

These and other features and advantages of the present invention will be in part apparent and in part pointed out in the following description of the preferred embodiment and drawings.

BRIEF DESCRIPTION OF THE DRAWINGS

FIGS. 1(a) through 1(i) illustrate exemplary display configuration states;

FIGS. 2(a) through 2(g) illustrate a storyboard progression of an exemplary transition effect;

FIG. 3 illustrates an exemplary transition effect selection table for a given style wherein transition effects are defined for all pairs of potentially successive display configuration states;

FIG. 4 illustrates a stacked array of transition effect selection tables for a plurality of styles;

FIG. 17 illustrates a transition effect table wherein an intermediate state is used; and FIG. 18 illustrates an intermediate state selection table.

DETAILED DESCRIPTION OF THE PREFERRED EMBODIMENTS

Figures 5, 6:
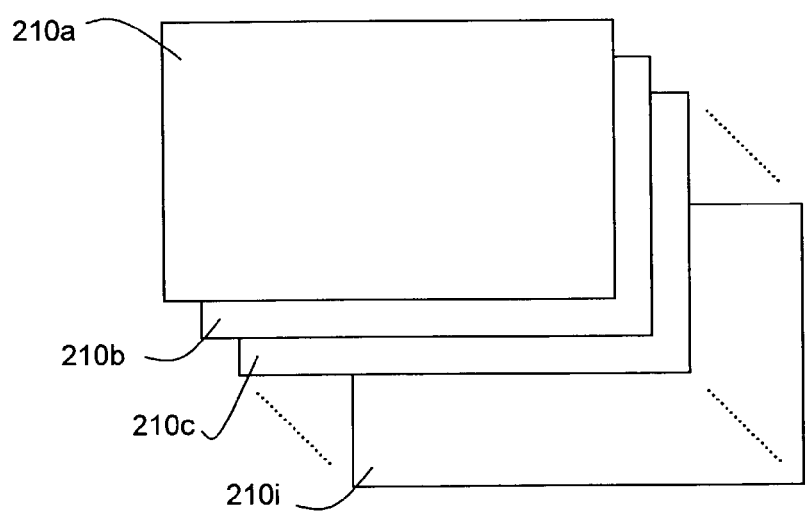
FIG. 5 illustrates an exemplary style guide translation table.
FIG. 6 illustrates a stacked array of style guide translation tables for a plurality of style guides.

In the context of the invention, a visual data presentation can be characterized as a series of successively displayed slides, each slide having a display configuration state and data content that is presented within the framework of the display configuration state. Slides comprise presentations in slideshow applications, videoconferences, video phone calls, and other video productions.

FIGS. 1(a)–(j) illustrate examples of display configuration states that may be used in the practice of the present invention. However, it must be pointed out that the scope of the invention is in no way limited by the specific examples of display configuration states shown in FIG. 1, as persons of ordinary skill in the art are readily capable a designing a virtually infinite number of different display configuration states.

A display configuration state is the format of a screen and defines the framework through which data content is presented. Typically, a display configuration state includes one or more frames.

FIG. 1(a) illustrates a display configuration state having a single frame 100 through which video data is presented. Frame 100 encompasses the full screen.

FIG. 1(b) illustrates a display configuration state having a frame 102 for video data, a frame 104 for text data, and a frame 106 for decoration. As can be seen, frame 102 is surrounded by both frame 104 and 106. Frame 104 is located in the upper left hand corner of the screen and stylistically shaped with three flat sides and a curved joining portion. Decoration frame 106 is white.

FIG. 1(c) illustrates a display configuration state having a frame 108 for video data, a frame 110 for text data, and a frame 112 for decoration. The display configuration state of FIG. 1(c) is very similar to that of FIG. 1(b) except text frame 110 (as compared to text frame 104 of FIG. 1(b)) is located in the lower right hand corner rather than the upper left hand corner and has been rotated clockwise by 180 degrees.

FIGS. 1(d) and 1(e) illustrate display configuration states similar to those of FIGS. 1(b) and 1(c), with the exception of decoration frames 118 and 124 being black.

FIG. 1(f) illustrates a display configuration state having a frame 126 for a still image, a frame 128 for text that is located immediately below image frame 126, a frame 130 for instant messaging, and a frame 132 for decoration.

FIG. 1(g) illustrates a display configuration state similar to that of FIG. 1(f), except the decoration frame 140 includes decorative circles.

FIG. 1(h) illustrates a display configuration state having a frame 142 for video data and a frame 144 for scrolling text data. The scrolling text frame 144 is located in the bottom portion of the screen.

FIG. 1(i) illustrates a display configuration state having frames 146 and 148 for video data and a frame 150 for decoration. As can be seen, video frame 146 is dominant with video frame 148 occupying a lesser portion of the screen and partially overlapping video frame 146.

FIG. 1(j) illustrates a display configuration state having a frame 152 for video data and a frame 154 for a still image. The video frame 152 occupies the full screen with image frame 154 overlapping video frame 152 in the upper left hand quadrant. Because such a display configuration state is often used (typically with newscasts) such that the video frame depicts a person talking while the image frame depicts a graphical element corresponding to the subject matter of the talking person's words, this display configuration can be referred to as an "Over-the-Shoulder View".

When a presentation transitions from a currently displayed state to the next state, a transition effect is inserted into the presentation during an interval between the current display configuration state and the next display configuration state. A transition effect is an image or a sequence of images that are displayed during a transition from one state to another. Transition effects are known in the art (see, for example, U.S. Pat. No. 5,640,522) and include transitions such as wipes, dissolves, fades, focuses, flying planes, pushes, pulls, cuts, and the like. However, this list is by no means exhaustive as a person having ordinary skill in the art could readily devise a wide variety of additional transition effects. Also, with reference to the display configuration states of FIG. 1, when a presentation transitions from a current state of FIG. 1(b) to a next state of FIG. 1(c), it may be the case that the transition effect rotates text frame 104 of FIG. 1(b) clockwise around the edge of the screen until it reaches the position of text frame 110 of FIG. 1(c), at which time the transition effect is complete.

Further, when a presentation transitions from a current state of FIG. 1(a) to a next state of FIG. 1(i), it may be the case that the transition effect slowly shrinks video frame 100 of FIG. 1(a) while enveloping it within a decoration frame such that the arrangement between video frame 146 and decoration frame 150 of FIG. 1(i) is reached. Thereafter, the video frame 148 would fly into position from the left side of the screen. Transition effects such as this are commonly used in television news programs, in order to transition from a news anchor in a full-screen video state to a state containing a video frame arranged "over-the-shoulder" of the news anchor in order to display a relevant news item.

For illustrative purposes, FIGS. 2(a) through 2(g) are a storyboard illustration of an exemplary transition effect implemented during the transition described above from the current state of FIG. 1(a) to a next state of FIG. 1(i). FIG. 2(a) represents the current state, which contains nothing but video source 160. In FIG. 2(b), decoration frame 162 starts to appear surrounding video frame 160, which is starting to shrink. In FIG. 2(c), video frame 164 appears at the right edge of the screen containing a second video source, tilted back in perspective. In FIGS. 2(d) through 2(f), the decoration frame 162 continues to expand, video frame 160 continues to shrink, and the second video frame 164 continues to fly across the screen as it rotates to reach an upright position. In FIG. 2(g), final frames of the completed transition are shown, wherein the screen has reached the next display configuration state represented by FIG. 1(i). Note that the foregoing describes a relatively simple transition effect in which only three elements are required to move on the screen, and two of these three elements are shared by both the current state (FIG. 2(a)) and the next state (FIG. 2(g)). A common practice in the art might be to move several disparate elements on the screen at once, such as to complete a transition between the states represented by FIGS. 1(c) and 1(f). Further, given that such transition effects and their associated animation techniques are readily known in the art, the details of implementing various transition effects need not be set out herein.

The selection of which transition effect is appropriate in a given circumstance depends not only on the current display configuration state, but also on the next display configuration state because the transition effect should provide an aesthetic progression from one to the other. Conventionally, when a presenter arranges a presentation by sequencing slides having various states, the presenter selects an appropriate transition effect for insertion between the predetermined sequence of slides (a slide being a display configuration state including the data content presented therethrough). However, it is often the case that, during the actual presentation, the slides will be presented out of their predetermined order (whether in response to viewer inquiries such as "can you go back to Slide 2?" or in response to ad lib decisions made during the presentation as to a better sequence). In such cases where slides are likely to be presented out of sequence, the transition effect planned for a transition from slide 4 to slide 5 may not be appropriate for a transition from slide 4 back to slide 2. Toward this end, one of the features of the present invention is an association of an appropriate transition effect with each pair of current-to-next state transitions that may potentially occur during a presentation. Because the selection of an appropriate transition effect is predefined for all state transitions that may occur during a presentation, the present invention eliminates the possibility of an inappropriate transition effect being implemented during the presentation, thereby increasing the professional quality of the presentation. This feature of the invention is also helpful for presentations where no predetermined slide sequence exists because it allows a presenter or viewer to make "on the fly" determinations as to the order of slides without going through the hassle of selecting an appropriate transition effect for each transition and without worrying whether the selected transitions are appropriate.

FIG. 3 illustrates an exemplary matrix 200 that illustrates the association of a set of transition effects with current-to-next state pairs. The top row 202 of the matrix 200 identifies the next display configuration state for the presentation. The leftmost column 204 of the matrix 200 identifies the current display configuration state. Each box 206 within the matrix 200 defines a pairing of the current state and the next state and includes the transition effect deemed appropriate for the transition defined by the box's current-next state pairing. Using the associational rules defined by the matrix 200, the presentation software, upon identifying a presentation transition from a current state to a next state, can determine the transition effect to be displayed during the transition. For example, if a presentation transitions from current state C to a next state A, transition effect 3 is automatically selected for implementation. Further, it should be noted that it is preferable for a presentation transition to occur on state transitions wherein the current state and the next state are the same. In such cases, the data content would be changing. In such transitions where only data content changes, it may also be desirable to implement a transition effect. As such, it is preferred that boxes corresponding to a State X to State X transition also identify an appropriate transition effect.

Preferably, each matrix 200 corresponds to a particular style guide. A style guide defines a plurality of style aspects that govern the appearance of a presentation. Style aspects can include the types of display configuration states used during a presentation and the types of transition effects used during a presentation as well as the colors, font treatments, backgrounds, sound effects, camera angles, speeds, and other discernible features of the presentation.

For example, a style guide for a presentation wherein the audience is children would include style aspects such as large fonts, bright colors, and splashy display configuration states and transition effects. However, a style guide for a presentation made by a company to its shareholders would be much less splashy and likely use traditional display configuration states and so-called tasteful transition effects. The variety of style guides that may be implemented by the present invention can be wide ranging, and is limited only by the imagination of designers. Many style guides will have highly divergent style aspects (such as would likely be the case for the children's presentation style guide and shareholder meeting style guide described above). Also, many style guides may have highly similar style aspects, which differ only in a few of the available display configuration states, or which have a different association of transition effects for a few current-next state pairings.

FIG. 4 illustrates the concept of a plurality of transition effect matrices stored within a style guide, in order to provide a plurality of potential transition effects that could be executed between any two display states. Depicted in FIG. 4 is a stack of transition effect matrices containing a plurality of transition sets that can be accessed within style guide A. Matrix 200a corresponds to the set of available display configuration states and the rules for one set of transition effects contained in style guide A, in the same manner as diagrammed in FIG. 3. Matrices 200b and 200c correspond to additional matrices containing rules for additional sets of available transition effects for style guide A. In these additional matrices the top and left rows duplicate the same display configuration states as defined in matrix 200a, and can thus store additional sets of effects that can be executed between any two of these states. In this manner, this stack of matrices can be used to store categorized sets of transition effects, which the designer of the style guide can organize as desired for convenient presentation to the end-user. Examples of such categorization might include: by type of transition effect (cuts, fades, wipes, flying effects, etc), or by the aesthetic "feeling" of the transition (simple, conservative, elegant, funny, flashy, etc). These sets of transition effects can then be selected by the end-user to be applied globally to the entire presentation thereby changing the appearance of all state transitions regardless of which states were used on a given slide, and/or can be applied to an individual slide thereby overriding the global setting to change the appearance of only the transition effect used for that slide. Alternatively, the transition set applied to a given slide could be selected automatically based on variables such as when it occurs in the presentation, the data content contained by that slide, the amount of motion in the presenter's video or the volume of the presenter's audio at the time the transition was activated, etc.

By selecting an appropriate style guide for a presentation, a presenter defines which display configuration states are available for use during the presentation and which sets of transition effects will be available for use during the presentation slide transitions. Preferably, the presenter can select the desired transition set at any point during the presentation to thereby automatically implement an aesthetic transition effect-limited change for the presentation "on the fly", without changing the overall appearance of the presentation by changing the entire style guide.

FIG. 5 illustrates how a global style guide change can be effected. As stated, each style guide has its own set of display configuration states available for use with the style guide. The available states are style aspects for the style guide. When converting from one style guide to another, a counterpart state in the next style guide must be known for each state of the current style guide. The table shown in FIG. 5 illustrates a counterpart table 210 defining how display configuration states are converted from one style guide to another. Table 210 defines counterpart display configurations states for a particular style guide (in the example of FIG. 5, Style Guide A) to all other style guides. In column 212, the display configuration states for Style Guide A are listed. In subsequent columns 214, the counterpart states for each entry in column 212 are listed. Each column 214 corresponds to a different style guide. Thus, if a user wishes to convert a given presentation to a new style, that user need only implement a global style change that will preferably convert the entire presentation to the new style with a single command. Examples of potential counterpart states can be seen in FIG. 1 with the states shown in FIGS. 1(b)–(e) (the stylistic changes being the location and orientation of the text frame and the color of the decoration frame) and FIGS. 1(f) and 1(g) (the stylistic change being the type of ornamentation within the decoration frame). However, as would be understood by those of ordinary skill in the art, any number of stylistically different counterparts can be developed for the variety of available display configuration states. Further, the stylistic differences may be greater than simple color changes or font changes and may encompass large differences in format (such as defining the states of FIGS. 1(b) and 1(h) as counterparts). Also, it should be noted that many style guides may differ only slightly from each other, and as such, several of the entries in columns 214 may identify only a small number of actual state changes.

FIG. 6 illustrates a style guide translation table stack where the relational table of FIG. 5 is created for each style guide. In FIG. 6, table 210a may correspond to a translation table for Style Guide A, table 210b may correspond to a translation table for Style Guide B, and so on. Once a conversion for a particular style has been selected, the transition effects appropriate to the selected style guide can be determined by reference to the transition effect matrix 200 for that style guide (see FIGS. 3–4).

Figure 7A:
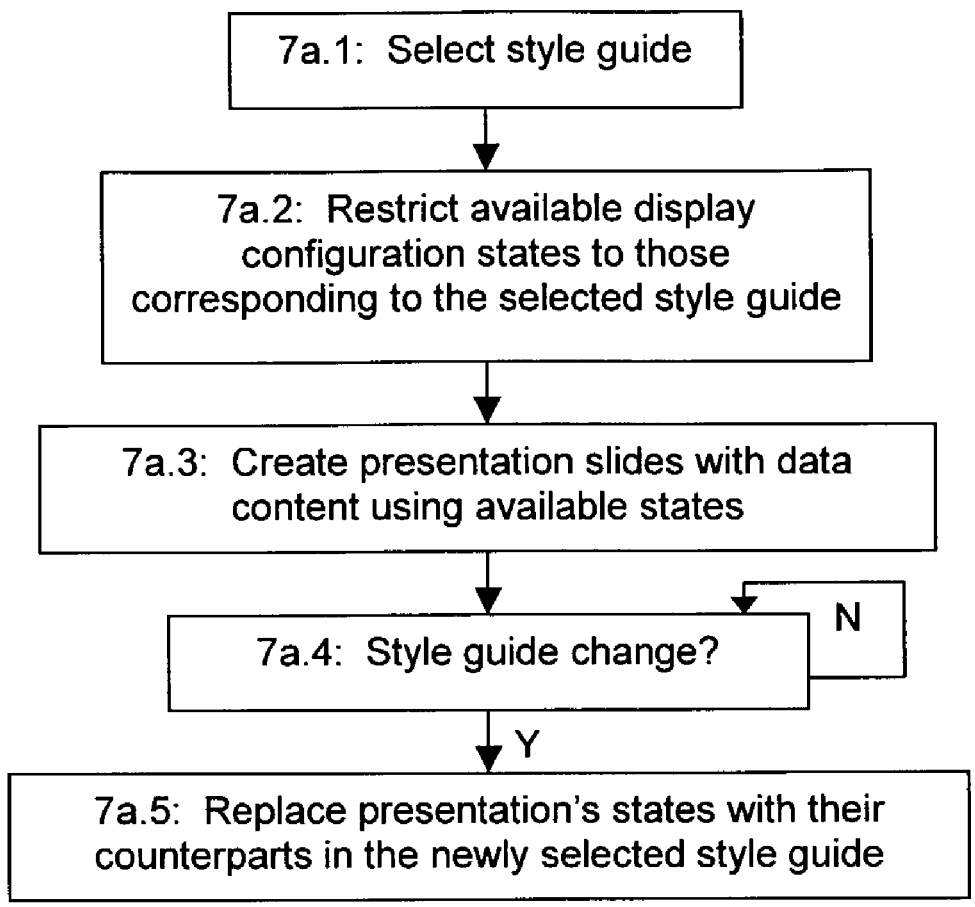
FIGS. 7(a) and 7(b) are flowcharts depicting the authoring of a multimedia slideshow application and style guide control.

FIG. 7(a) is a flowchart depicting how a user can author a presentation in accordance with a preferred embodiment of the present invention. A step 7a.1, a style guide for the presentation is selected. At step 7a.2, software restricts the available display configuration states for the presentation to those corresponding to the selected style guide. Next, at step 7a.3, the user proceeds to create the presentation. Preferably, this step involves the user preparing the individual slides of the presentation through selection of individual display configuration states and the identification of data content to fill those states. The user need not be the author of the data content, and may instead only identify Internet addresses where such content is available. Once the presentation is created (or during the creation thereof), a user has the option to change the presentation's style (step 7a.4). If the user selects a new style guide, the software refers to the appropriate table 210 and automatically replaces the presentation's states with their counterparts in the newly selected style guide (step 7a.5).

Figure 7B:
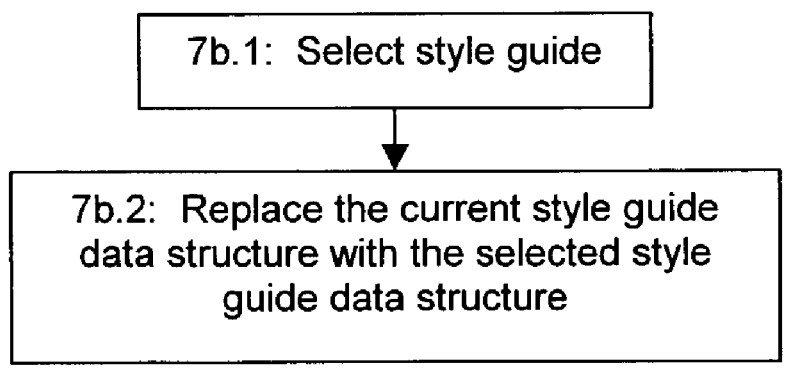
Figure 10:
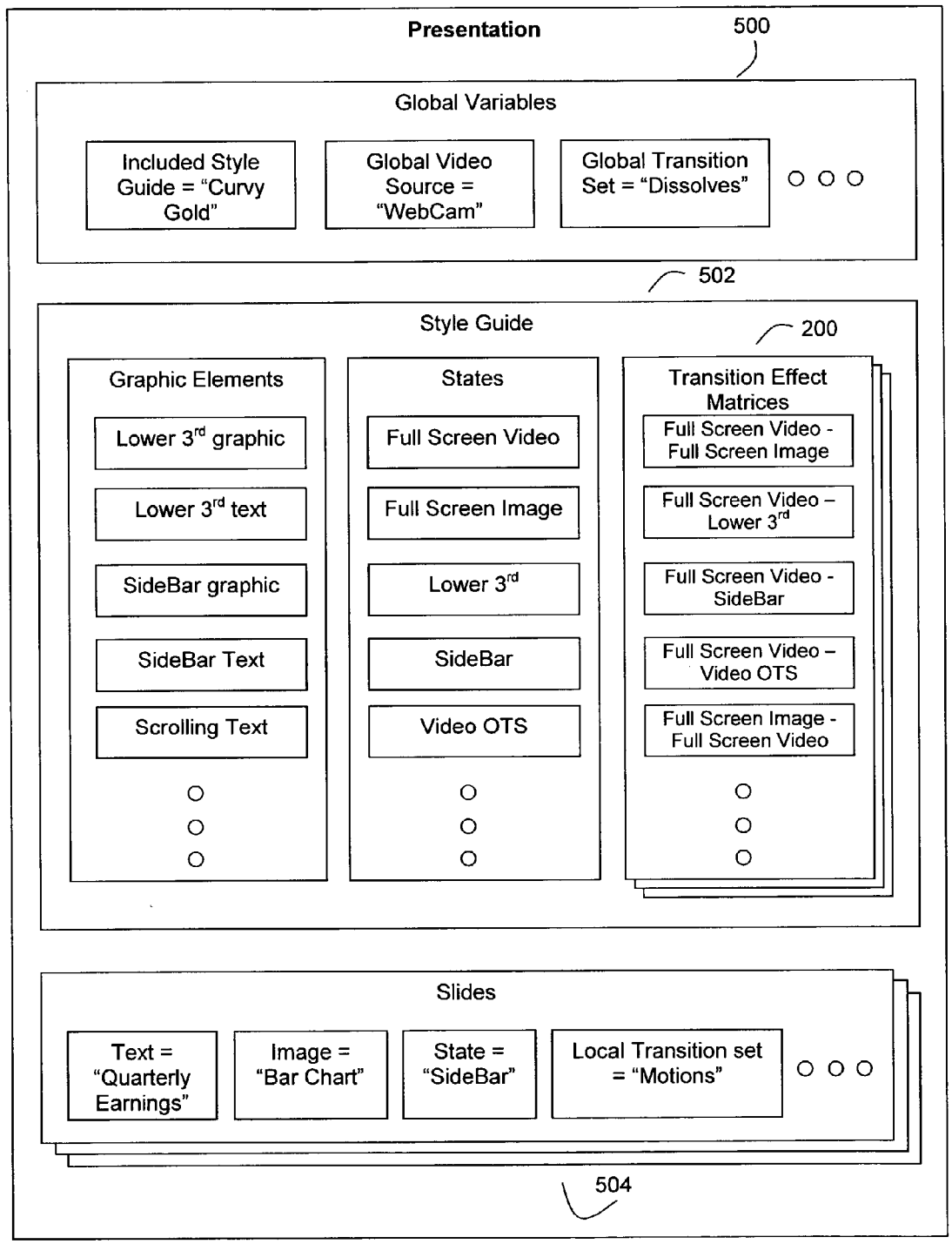
FIG. 10 is a diagram illustrating a preferred presentation data structure for the present invention.

It should be noted that the steps of FIG. 7(a) can be performed as a block replacement operation (see FIG. 7(b)) if a presentation data structure of the type shown in FIG. 10 is used. Further, for style guides having orthogonal sets of available display configuration states, counterpart tables 210 such as that shown in FIG. 5 may not be needed as the block replacement will automatically replace each state with its counterpart in the new style guide without reference to a correlation table.

Figure 8:
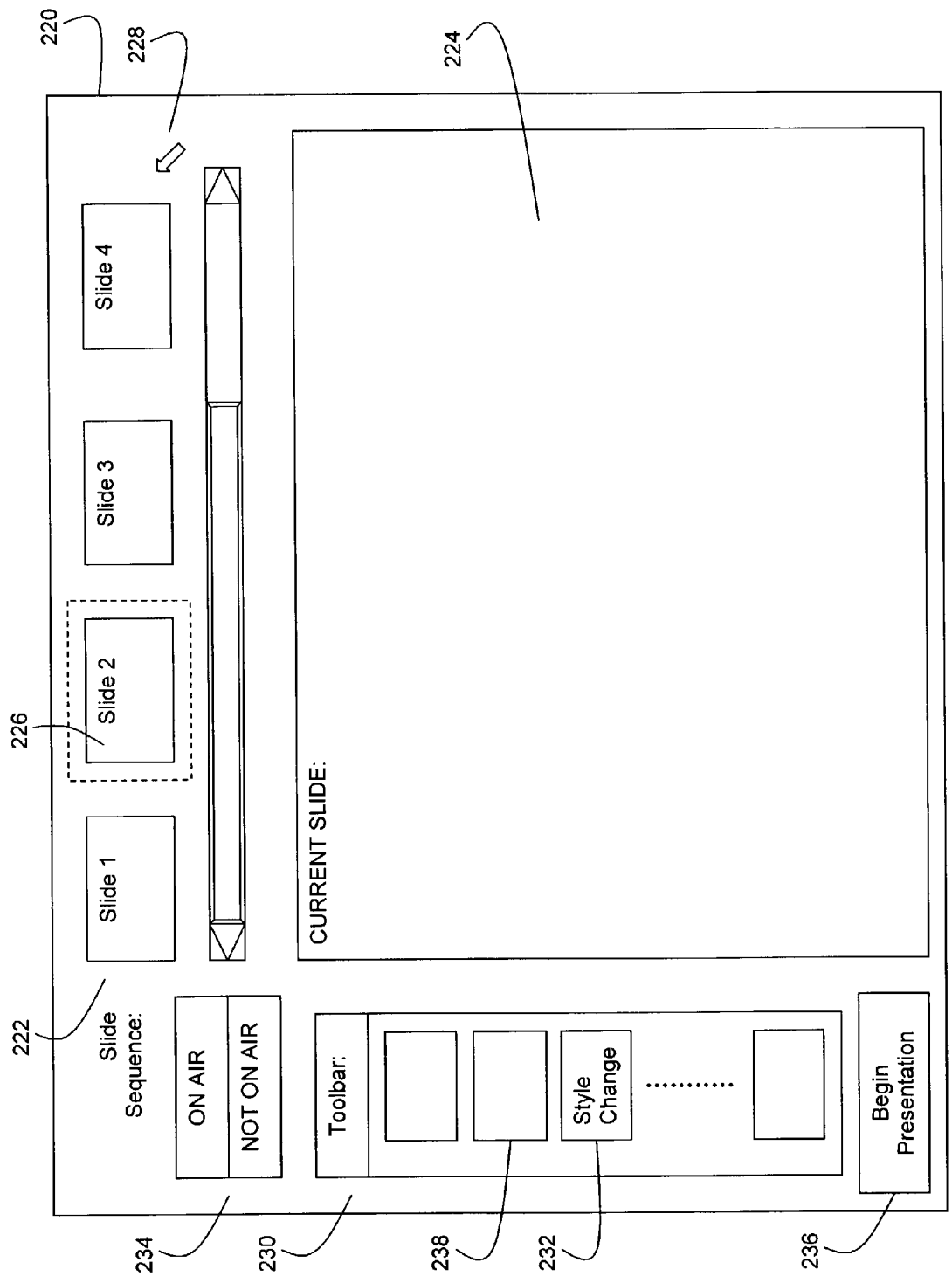
FIG. 8 depicts a preferred presenter interface for a multimedia slideshow application.

FIG. 8 illustrates a preferred user interface for authoring and delivering a multimedia slideshow presentation. Included on screen 220 is a display area 222 of the slides created for a given presentation. Preferably, the slides are arranged in a sequence determined by the presenter as the planned sequence. However, this need not be the case. By clicking cursor 228 upon one of the slides shown in display area 222, the presenter selects a slide as the current slide 226 (indicated with a dashed box). Such selection causes the slide to be shown in feedback window 224. If the presentation is "on the air", such selection would also cause that slide to be presented to the viewer(s).

Icon 236 is also selectable with the cursor 228 and corresponds to an instruction by the presenter to start the presentation. The details of starting a multimedia slide show presentation via computer being known in the art, such details need not be elaborated upon herein. Icon 234 is a status indicator that identifies to the presenter whether the presentation has gone live ("on air") or whether the presentation is offline ("not on air"). When offline, the presenter can preview the presentation by selecting the different slides in display area 222 and viewing those slides in feedback window 224. When online, the presenter selects the slides in display area 222 when the presenter wants the audience to see those slides. Feedback window 224 allows the presenter to know what information is being conveyed to the audience at any given time. Control toolbar 230 includes selectable icons corresponding to various functions including a "style change" icon 232, that is selectable to implement a style guide change, and a "select transition effect" icon 238 that is selectable to implement either a global change or a local change (slide-specific) to the transition effect set from which the transition effect for the transition is determined.

Figure 9A:
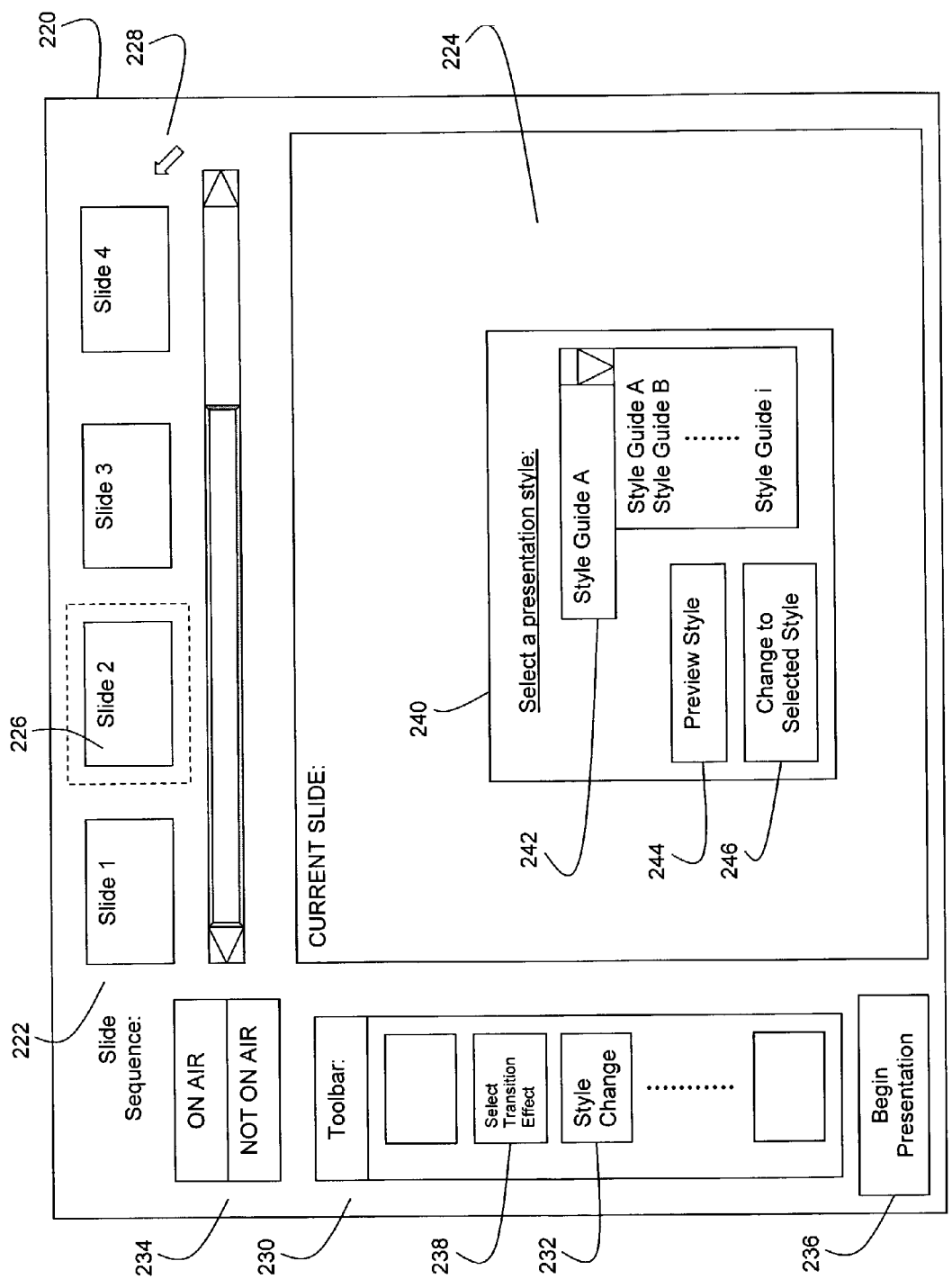
FIG. 9(a) depicts a preferred presenter interface for globally changing the style of a presentation in a multimedia slideshow application.

FIG. 9(a) illustrates a style guide change window 240 that preferably appears upon selection of icon 232. Style guide change window 240 allows the presenter to make a global style guide change for the presentation. Such a change can be implemented whether the presentation is offline or online. Window 240 preferably includes a dropdown menu 242 for selecting a new style guide, a selectable icon 244 for previewing the new style guide, and an icon 246 for changing the presentation in accordance with the new style guide.

Figure 9B:
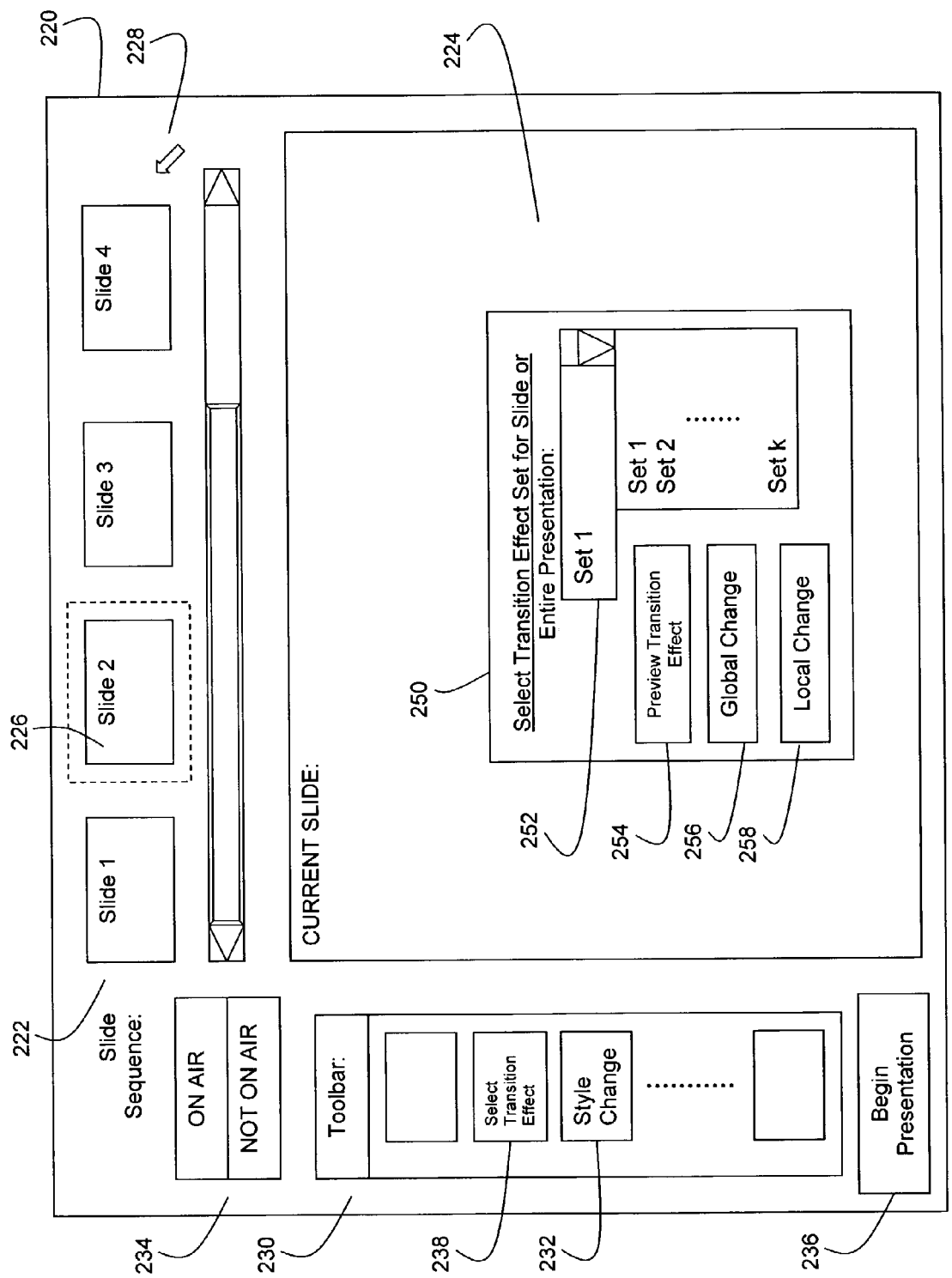
FIG. 9(b) depicts a preferred presenter interface for changing the transition effect set, either globally or locally, in a multimedia slideshow application.

FIG. 9(b) illustrates a transition effect set change window 250 that preferably appears upon selection of icon 238. Transition effect set change window 250 allows the presenter to make either a global change to the transition effect set for the presentation (to a different transition effect set available within the selected style guide) or a local change to the transition effect set (to a different transition effect set available within the selected style guide) for a particular slide. Such a change can be implemented whether the presentation is offline or online. Window 250 preferably includes a dropdown menu 252 for selecting a new transition effect set, a selectable icon 254 for previewing the new transition effect set, an icon 256 for making the making the newly selected transition effect set the global set for the presentation and an icon 258 for locally changing the transition effect set for the selected slide.

As stated above, the slides in display area 222 can be arranged in a desired sequence before the presentation. In this case, the automatic selection is preferably applied to reduce the burden on the user of having to manually select transitions between the display configuration states used on adjacent slides in the sequence. However, it is often the case that during the presentation, the presenter will decide to change the sequence, either in response to audience feedback (e.g., going back to a previous slide to review a previous topic or skipping to a later slide to address an audience question that arises) or a spur of the moment desire. In such situations, the presenter can alter the planned sequence by simply selecting the slide in area 222 that he/she wishes the audience to view next. In such cases, because the appropriate transition effects for the present invention are predefined for all possible pairs of successive display configuration states, the transition from one slide to the next will appear natural even whether or not it was planned in advance. FIG. 10 is a diagram illustrating the hierarchical presentation data structure of the present invention, depicted as a set of nested blocks. The primary components of the presentation data structure are global variables 500, style guide data structure 502, and slide data structures 504.

The global variables 500 define the style guide globally selected for the presentation, the video source globally selected for the presentation (if the presentation includes a global video source), and the transition effect set globally selected for the presentation. The data stored in the global transition set variable is preferably a reference to one of the transition effect sets stored in the style guide data structure 502).

The style guide data structure 502 defines the graphical elements that are available for use with the various display configuration states and transition effects, the display configuration states available for the presentation, and the sets of transition effects that are available for the presentation. As noted above, one of the global variables will refer to one of these sets of transition effects, thus allowing it to serve as the global transition effect set for the presentation.

Slide data structures 504 include identifiers for any text or images that represent the slide's data content. Such identifiers may be the data content itself or a URL to the data content. Each slide data structure 504 also includes a state identifier that identifies the slide's display configuration state. Further still, the slide data structure 504 includes a local variable for identifying a transition effect set from the available transition effect sets in the style guide data structure 502. The transition effect set identifier defaults to pointing to the global transition effect set variable, but may instead be a local variable that overrides the global variable by pointing directly to one of the transition effect sets available in the style guide data structure other than the one defined by the global variable.

Figure 11:
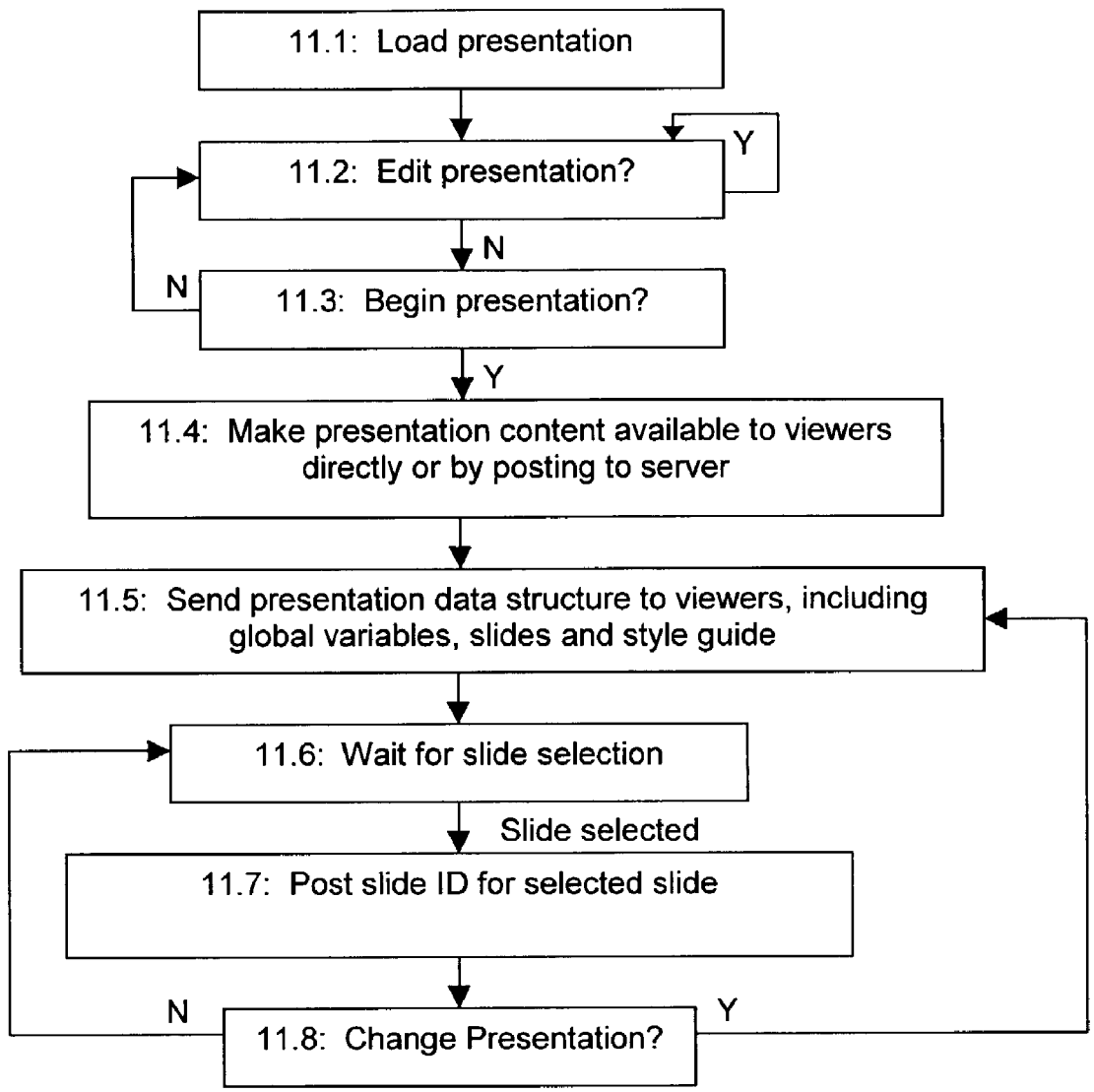
FIG. 11 is a flowchart depicting the presenter's delivery of a multimedia slideshow application.

FIG. 11 is a flowchart depicting presentation delivery. At step 11.1, the presenter loads the presentation. Once the presentation is ready for delivery (steps 11.2 and 11.3), the presentation's data content is made available to the viewer(s), either directly or by posting the content files to a server accessible by the viewer(s) (step 11.4). Thereafter, at step 11.5, the presentation's data structure (see FIG. 10) is sent to the viewer(s). Once the presentation data structure is communicated to the viewer(s), specific slides are ready for presentation. The viewer computer(s) making up the audience will be running software capable of drawing the various display configuration states and transition effects (either through a script passed to the viewer computer(s) or through pre-existing software stored by the viewer computer(s)).

Once the presenter selects a slide for presentation (step 11.6), the selected slide's ID is posted which allows the viewer(s) to retrieve the pertinent slide data structure from the presentation data structure (step 11.7). Once the slide's data structure is identified, the appropriate display configuration state and data content therefor is known. Further, the pertinent transition effect set to use when transitioning out of that slide to a next slide is known. Thus, the viewer computer(s) have sufficient information to display the slide and transition to the next slide. In the event the presenter wants to alter the presentation during its delivery, the process loops back to step 11.5 where a new/adjusted presentation data structure is provided to the viewer(s) that corresponds to the changes desired by the presenter. In the event the presenter wishes to change the presentation's style guide, the global style guide variable would be replaced with a new style guide, the style guide data structure 502 would be replaced with a style guide data structure corresponding to the new style guide, and the slide data structure identifiers for states and transition effect sets would be replaced with their counterparts in the new style guide.

Figure 12:
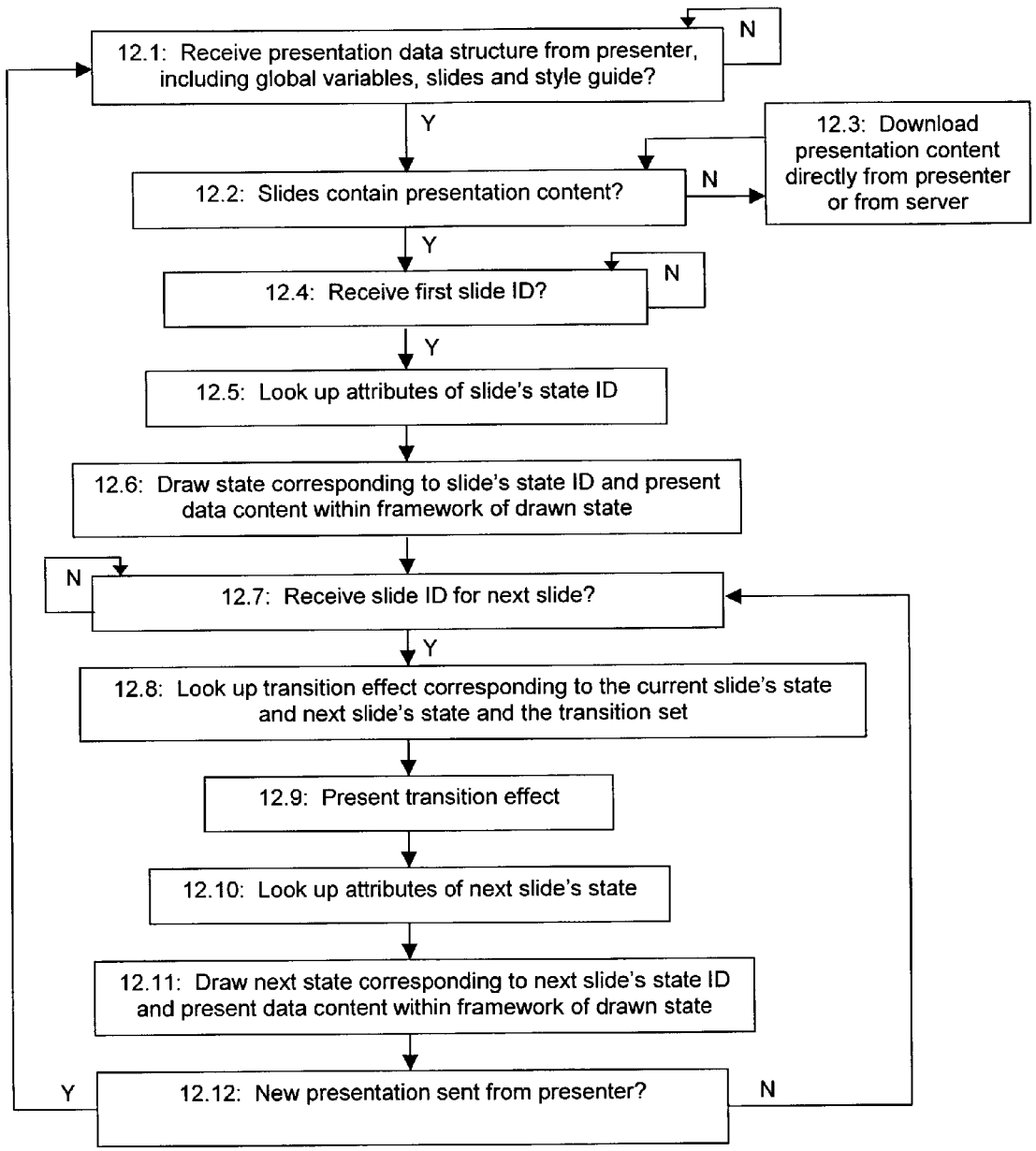
FIG. 12 is a flowchart depicting the operation of a viewer computer during a multimedia slideshow application.

FIG. 12 is a flowchart illustrating the preferred operation of the viewer computer(s) during the presentation. At step 12.1, the viewer receives the presentation data structure (see FIG. 10) from the presenter. At steps 12.2 and 12.3, for slides that the viewer has not received data content, the viewer obtains that content, either directly from the presenter or from a server.

At step 12.4, the viewer receives a slide identifier from the presenter. Once in receipt of the slide identifier, the viewer can look up the attributes of the appropriate slide data structure in the received presentation data structure. Thus, at step 12.5, the state identifier for the slide is identified in the pertinent slide data structure. Next, at step 12.6, the viewer computer draws the display configuration state corresponding to the state identifier using the information found in the style guide data structure 502. Also, the data content found in the pertinent slide data structure is presented within the framework of the drawn state.

At step 12.7, the viewer receives a slide identifier from the presenter corresponding to the next slide of the presentation. Thereafter, at step 12.8, the viewer computer identifies from the received presentation structure the transition effect appropriate for a transition from the current slide's state to the next slide's state. Preferably, the viewer compute performs this task using either the transition set identified by the local variable in the slide data structure of the currently presented slide, or the transition set identified by the global variable if no local variable has been chosen by the user. Thereafter, the viewer computer identifies the appropriate transition effect within that transition effect set using the current slide's state identifier and the next slide's state identifier (determinable from the slide data structure corresponding to the slide ID of the next slide). Once the transition effect corresponding to the current-to-next state is identified, that transition effect is presented to the viewer (step 12.9).

At step 12.10, the attributes of the next slide are determined from the slide data structure corresponding to the slide ID received at step 12.7. Thereafter, the next slide's state is drawn and the next slide's data content is presented within the framework of the drawn state (step 12.11). The next slide now becomes the current slide and the process repeats itself. If the viewer receives an indication that the presenter has changed the presentation (step 12.12), then the process loops back to step 12.1 wherein the presentation data structure corresponding to the adjusted presentation is received. If no presentation changes are identified, the process loops back to step 12.7 to await the next slide.

While the flowcharts of FIGS. 11 and 12 have been described in connection with their preferred embodiments, it is to be understood that practitioners of the present invention can deliver presentations to viewers using a variety of techniques. For example, the entire presentation can be assembled on the presenter side of the network with the viewers receiving finished slides rather than assembling the slides themselves from the information provided by the presenter. As such, the examples of FIGS. 10 and 11, while being effective at conserving bandwidth, are only illustrative of the preferred embodiment.

Also, it should be noted that the software implementing the present invention can be distributed. For example, the software can be stored on the presenter computer with the viewer computer(s) receiving only the scripts necessary to perform viewing tasks. Alternatively, the software can be stored on a web server with the presenter computer accessing software modules corresponding to presenting tasks and the viewer computer(s) accessing software modules corresponding to viewing tasks. Of course, the presenter computer and viewer computer(s) may also each store the entire software package thereon.

Further, it should be noted that the software implementing the present invention is preferably coded in the C++ language, with the style guides and their associated display configuration states and transition effect matrices being stored in a data storage language, preferably in the XML language. However, as would be apparent to those of ordinary skill in the art, a variety of other programming languages and storage methods may be used. Also, while it is preferred that the presenter computer and viewer computer(s) be conventional general purpose PCs with at least some form of multimedia display capabilities, this need not be the case. For example, the presenter computer and viewer computer(s) may be hand-held PDAs or the like, or could be implemented as a custom-designed software/hardware consumer product or chip set using one or more existing technologies such as embedded CPU, FPGA, ASIC, DSP, etc. In another example when applied in a professional television production environment, the viewer computer would be one or more pieces of video graphics and effects equipment that can be controlled from the presenter computer via communications protocols such as Ethernet, SCSI, RS422, etc. In this case, the display configuration states and transition matrices in a given style guide as described in the current invention would necessarily be correlated with and used to activate pre-designed sets of appropriate graphic display elements and animated effects that are stored on the appropriate video effects equipment.]

Figure 13:
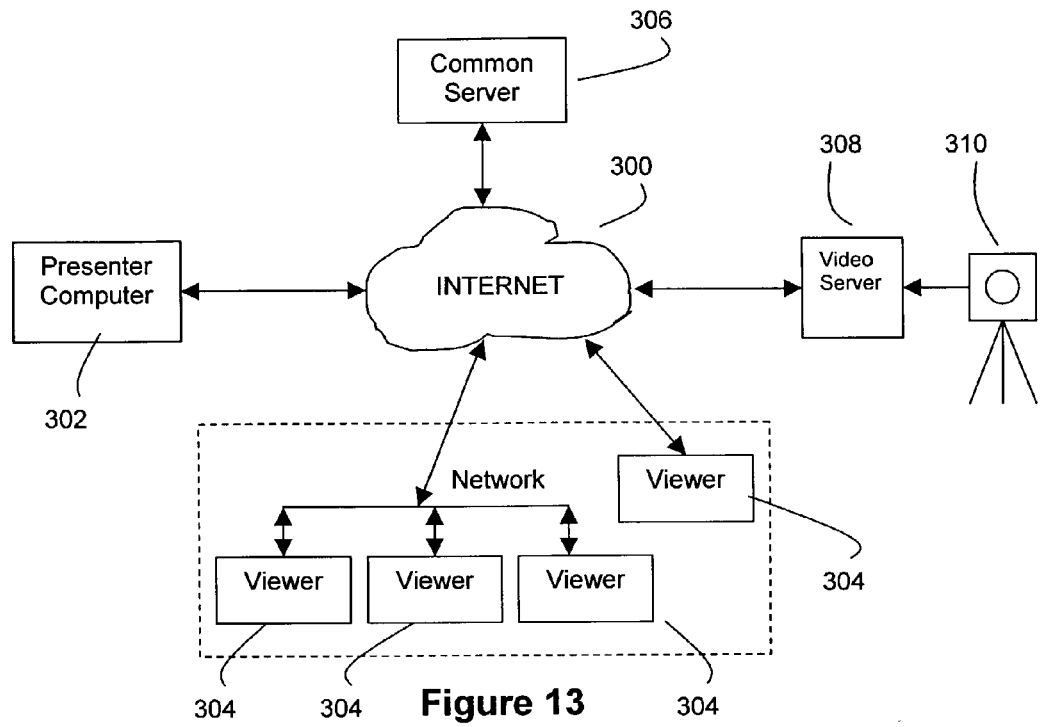
FIG. 13 illustrates an architectural overview for an application of the present invention in connection with a multimedia slideshow presentation delivered over the Internet.

FIG. 13 illustrates an architectural overview for an online multimedia slideshow application with the present invention. A network 300 such as the Internet interconnects a presenter computer 302, a web server 306, and a plurality of viewer computers 304. The presenter computer 302 authors and controls the presentation in accordance with FIGS. 7–10. The presenter computer posts the presentation data (state and style identifiers, data content) to the web server 306, and the viewer computers access the server 306 to view the presentation (see FIG. 11). In situations where the presenter computer 302 does not have the data content for the presentation stored locally, the presenter computer can post a URL for such content to the server 306, whereupon accessing the server, the viewer computers can retrieve the data content located at the posted URL. Also, it is often the case that the presenter will provide a video feed to the viewers (from video source 308 and video camera 310). The video camera 308 and video source 308 can be remote from the presenter computer 302, although that need not be the case, particularly when the presenter uses the video camera to image himself/herself for display to the viewers.

Figure 14:
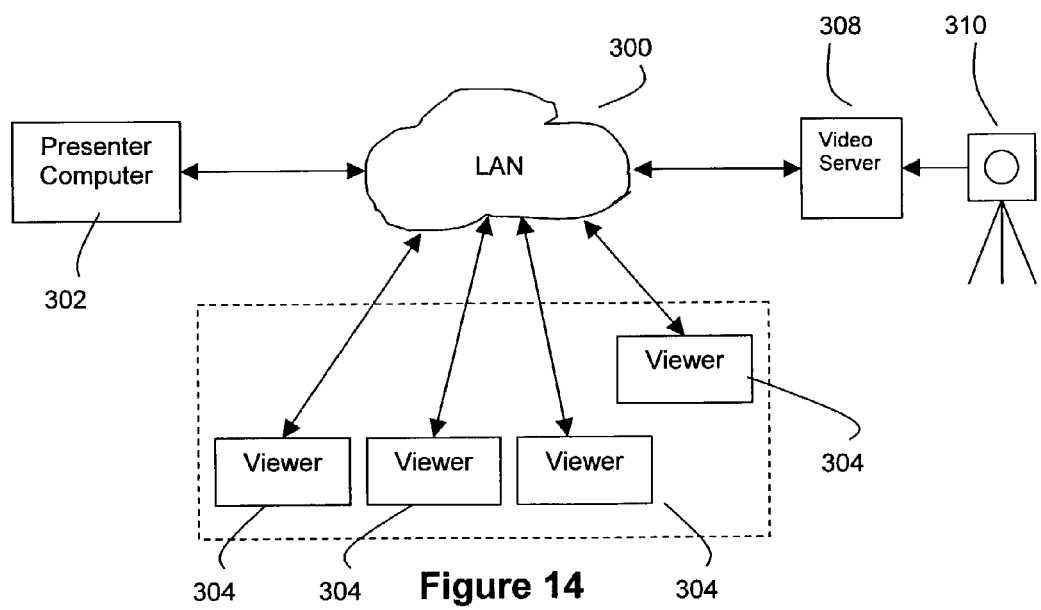
FIG. 14 illustrates an architectural overview for an application of the present invention in connection with a multimedia slideshow presentation delivered over a local area network.

FIG. 14 illustrates an architectural overview for an online multimedia slideshow application with the present invention wherein the presentation is delivered over a local area network (LAN). When implemented over a LAN, where network latency and firewall obstacles are presumably less of a problem than with connections made via the Internet, the common server 306 can be eliminated. Presentation data can pass directly from the presenter computer 302 to the viewer computers 304 via the LAN.

Figure 15:
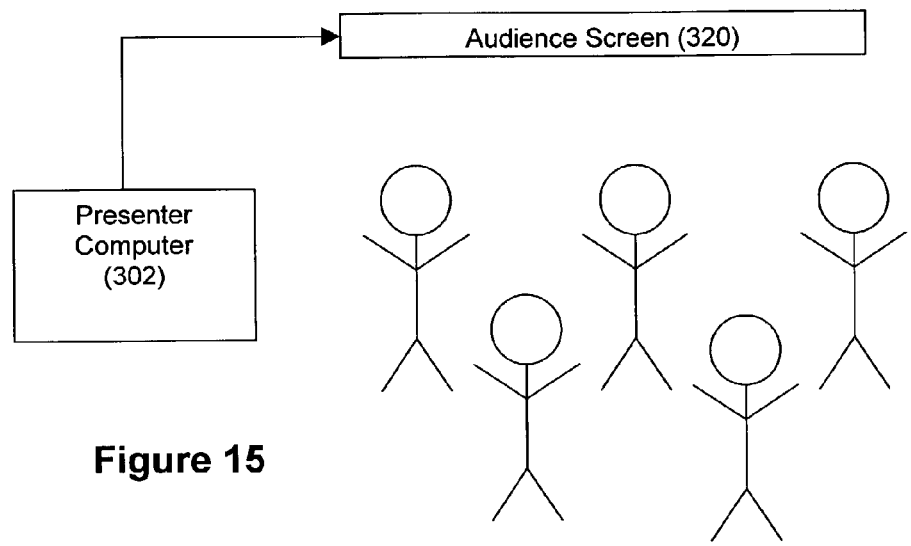
FIG. 15 illustrates an architectural overview for an application of the present invention in connection with a multimedia slideshow presentation delivered from a presenter computer to a nearby audience.

FIG. 15 illustrates an architectural overview for a multimedia slideshow application with the present invention wherein the presentation is delivered to a nearby audience without the need for network interconnection between viewer computers and the presenter computer. In this case, the audience may be co-located in a single room and the presentation may be transferred from a presenter computer 302 to an audience screen 320. The screen may either be a TV or computer monitor of sufficient size for the audience to view the presentation, or a projection screen upon which the images of the presentation are projected, such techniques being known in the art.

Figure 16:
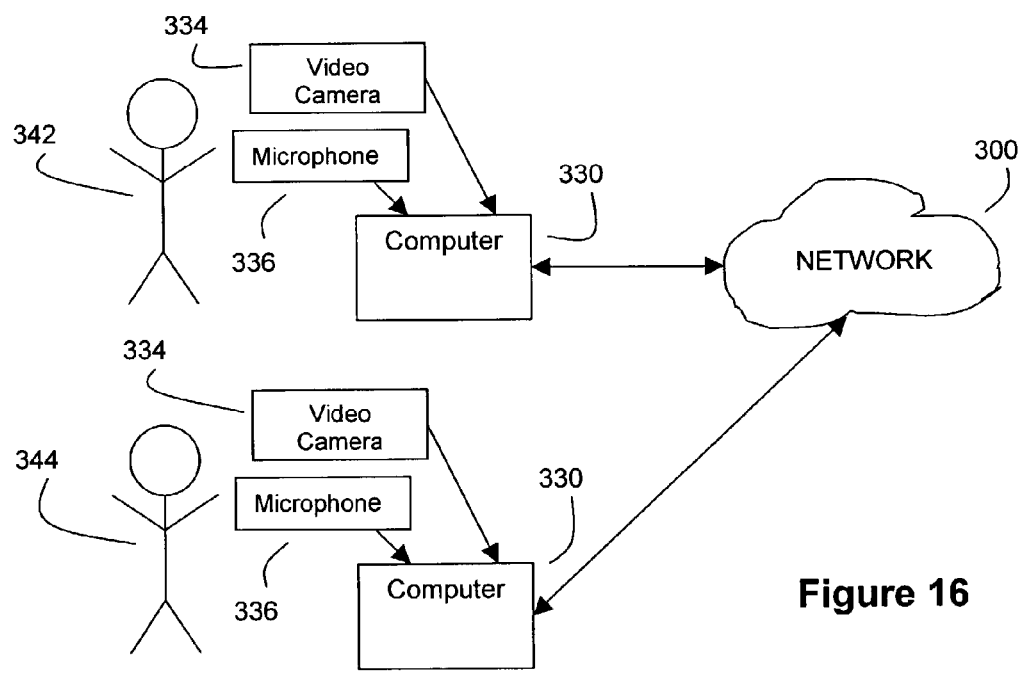
FIG. 16 illustrates an architectural overview for an application of the present invention in connection with a videoconference/video phone call.

FIG. 16 illustrates a videoconferencing/video phone application suitable for use with the present invention. Two or more persons 342 and 344 can interact with audio/video communications via network 300 in accordance with the teaching of the present invention. Each person may use a video camera 334 and microphone 336 to capture the audio/video communication data. Using computers 330, each person can exchange that communication data to implement a videoconference or a two way video phone call.

The person 342 or 344 designated as caller or conference manager, preferably controls the style of the display configuration states used in connection with the communications. Style changes can be effected in accordance with the techniques previously discussed.

Additionally, data content other than the audio/video feed can be transmitted during the exchange. For example, a document (or pertinent portions thereof) that is the subject of the conference/phone call can be displayed along with video images of the participants. Different display configuration states can be used such as (1) a frame for video feed of a participant along with a text box of the participant's name, (2) a frame for video feed of a participant along with a text box of the participant's location, (3) frames for video feed of all participants along with a text box of the participants names/locations, (4) a dominant frame for the video feed of the participant doing the talking along with a small frame for the video feed of the participant not talking, (5) a dominant frame illustrating a pertinent portion of a document being discussed by the participants, etc. Switching between the different states can be done automatically upon sensing particular conditions (e.g. time (switching from one state to another automatically upon a predetermined amount of time elapsing), who is talking (sensing which participant is doing most of the talking and using a state that focuses on that participant), and caller/receiver/conference manager input (allowing such a designated party to switch among the different states as he/she chooses). Particularly in cases where one participant is given control over which display configuration state is to be used at which time, the automatic transition effect feature of the present invention allows for the selection of the appropriate transition effect transparently to the caller/conference manager.

While the present invention has been described above in relation to its preferred embodiment, various modifications may be made thereto that still fall within the invention's scope, as would be recognized by those of ordinary skill in the art following the teachings herein.

For example, it need not be the case that a direct transition be available from each state to each state. It may be the case the some transitions between the state of a current slide and the state of a next slide use an indirect path wherein an intermediate state is reached, the intermediate state providing a bridge between the two states. The transition effect associated with the current-to-intermediate state pair will be presented during the transition to the intermediate state. Once that transition effect is completed, the intermediate state is drawn, and once drawn, an automatic transition from the intermediate state to the state of the next slide occurs. During this transition, the transition effect that is associated with the intermediate-to-next state pair is presented. FIG. 17 illustrates a suitable table 400 wherein a common intermediate state is used, and the transition effects 406 are associated with different states 402 as they transition to (406) or transition from (408) themselves to the intermediate state.

Further, it may be the case that all transitions pass through an intermediate state, in which case a table 410 such as the one shown in FIG. 18 would be used to identify the intermediate state to be used during the transition. Once the intermediate state is known, the appropriate table 400 can be identified.

These and other modifications to the invention will be recognizable upon review of the teachings herein. As such, the full scope of the present invention is to be defined solely by the appended claims and their legal equivalents.

What is claimed is:

1. With a visual presentation of data comprising a plurality of slides that are successively presented to a viewer, a method for transitioning from one presented slide to the next successive slide, the method comprising:
   for each possible transition from a currently presented slide to a next successive slide, associating a transition effect therewith in response to input from a user such that the user has an option to associate a plurality of different transition effects with a plurality of transitions from the same currently presented slide; and
   during a transition from a currently displayed slide to a next successive slide, presenting the transition effect associated therewith.

2. The method of claim 1 wherein the presentation comprises a plurality of slides having a predetermined order of succession, wherein the predetermined order is adjustable, the method further comprising:
   selecting a next slide for presentation to the viewer, the selected slide not being part of the predetermined order of successive slides;
   determining which transition effect is associated with a transition from a currently presented slide to the selected slide; and
   presenting the determined transition effect during the transition from the currently presented slide to the selected slide.

3. The method of claim 1 wherein the presentation comprises a plurality of slides having no predetermined order of succession, the method further comprising:
   selecting a next slide for presentation to the viewer;
   determining which transition effect is associated with a transition from a currently presented slide to the selected slide; and
   presenting the determined transition effect during the transition from the currently presented slide to the selected slide.

4. The method of claim 1 further comprising:
   selecting a style guide for the presentation from a plurality of style guides; and
   applying the selected style guide to the slides of the presentation.

5. The method of claim 4 wherein each slide comprises a display configuration state through which data content is presented, wherein the transition effect associating step comprises, for each possible transition between successive display configuration states, associating a transition effect therewith.

6. The method of claim 4 wherein each slide comprises a visual display configuration state through which data content is presented, wherein each style guide has a plurality of visual display configuration states corresponding thereto, and wherein the applying step comprises:
   replacing each slide's visual display configuration state with a visual display configuration state corresponding to the selected style guide.

7. The method of claim 6 further comprising:
   for each style guide, associating each of its corresponding visual display configuration states with a plurality of counterpart display visual configuration states in the other style guides; and
   wherein the converting step comprises changing each slide's visual display configuration state to its counterpart visual display configuration state in the selected style guide.

8. The method of claim 6 wherein each style guide has a transition effect set corresponding thereto, the transition effect set comprising the transition effects available for presentation to the viewer during slide transitions, and wherein the applying step further comprises:
   using the transition effects of the transition effect set corresponding to the selected style guide when performing the associating step.

9. The method of claim 8 wherein each style guide has a plurality of transition effect sets corresponding thereto, the method further comprising selecting a transition effect set from the plurality of transition effects corresponding to the selected style guide, and wherein the applying step further comprises using the transition effects of the selected transition effect set when performing the associating step.

10. The method of claim 9 wherein the transition effect set selecting step comprises selecting a transition effect set from the plurality of transition effects corresponding to the selected style guide on a slide-specific basis.

11. The method of claim 9 wherein the transition effect set selecting step comprises selecting a transition effect set from the plurality of transition effects corresponding to the selected style guide on a global presentation-wide basis.

12. The method of claim 5 wherein each style guide has a transition effect set corresponding thereto, the transition effect set comprising the transition effects available for presentation to the viewer during slide transitions, and wherein the applying step further comprises:
   using the transition effects of the transition effect set corresponding to the selected style guide when performing the associating step.

13. The method of claim 12 wherein each style guide has a plurality of transition effect sets corresponding thereto, the method further comprising selecting a transition effect set from the plurality of transition effects corresponding to the selected style guide, and wherein the applying step further comprises using the transition effects of the selected transition effect set when performing the associating step.

14. The method of claim 13 wherein the transition effect set selecting step comprises selecting a transition effect set from the plurality of transition effects corresponding to the selected style guide on a slide-specific basis.

15. The method of claim 13 wherein the transition effect set selecting step comprises selecting a transition effect set from the plurality of transition effects corresponding to the selected style guide on a global presentation-wide basis.

16. A method of controlling a visual presentation of data to a viewer, the visual presentation comprising a plurality of display configuration states through which data content is presented to a viewer, the presentation being responsive to transition input to transition from a current visual display configuration state to a next visual display configuration state, the method comprising:

providing a plurality of transition effects;

for each pair of potentially successive visual display configuration states, associating a transition effect therewith;

receiving transition input indicative to transition from a current visual display configuration state to a next visual display configuration state, the transition defining a pair of successive visual display configuration states; and during the transition from the current visual display configuration state and the next visual display configuration state, presenting to the viewer the transition effect associated with the defined pair of successive visual display configuration states.

17. The method of claim 16 further comprising:

providing a plurality of style guides, each style guide having a plurality of transition effects corresponding thereto;

selecting a style guide for the presentation from the plurality of provided styles guides; and wherein the step of associating transition effects with pairs of potentially successive visual display configuration states comprises, for each pair of potentially successive visual display configuration states, associating a transition effect that corresponds to the selected style guide therewith.

18. The method of claim 17 wherein each style guide has a plurality of available visual display configuration states corresponding thereto, the method further comprising:

for each style guide, associating each of its available visual display configuration states with a plurality of counterpart visual display configuration states in the other style guides; and in response to a style guide selection, replacing the presentation's visual display configuration states with their counterparts in the selected style guide.

19. The method of claim 18 wherein the style guide selecting step comprises selecting a style guide for the presentation from the plurality of provided styles guides in response to user input.

20. The method of claim 17 wherein the plurality of transition effects corresponding to each style guide are grouped in a plurality of transition effect sets that are available with the style guide, the method further comprising selecting a transition effect set from the selected style guide from the plurality of transition effect sets available with the selected style guide, and wherein the step of associating transition effects with pairs of potentially successive visual display configuration states comprises, for each pair of potentially successive visual display configuration states, associating a transition effect therewith that belongs to the selected transition effect set.

21. The method of claim 20 wherein the transition effect set selecting step comprises selecting a transition effect set from the selected style guide from the plurality of transition effect sets available with the selected style guide on a slide-specific basis.

22. The method of claim 20 wherein the transition effect set selecting step comprises selecting a transition effect set from the selected style guide from the plurality of transition effect sets available with the selected style guide on a global presentation-wide basis.

23. The method of claim 16 wherein at least one of the transitions from a current visual display configuration state to a next visual display configuration state is an indirect transition comprising a transition from a current visual display configuration state to an intermediate visual display configuration state and a transition from the intermediate visual display configuration state to a next visual display configuration state.

24. The method of claim 16 wherein the transition input is a user action.

25. The method of claim 16 wherein the transition input is a time value.

26. The method of claim 16 further comprising:

presenting data content to the viewer within the current visual display configuration state.

27. The method of claim 16 wherein the visual presentation is a multimedia presentation comprising a plurality of slides, each slide comprising content presented through a visual display configuration state.

28. The method of claim 27 wherein the multimedia presentation is a presentation delivered from a presenter computer to at least one viewer computer, the presenter computer and at least one viewer computer being interconnected via a computer network.

29. The method of claim 16 wherein the visual presentation is a video conference.

30. The method of claim 16 wherein the visual presentation is a video phone call.

31. The method of claim 27 wherein the plurality of slides has a predetermined order of succession, the predetermined order being adjustable during the visual presentation such that the slides can be displayed in an order out of the predetermined order of succession,wherein the display configuration state through which a currently presented slide is presented comprises the current display configuration state, and wherein the transition input receiving step comprises receiving a transition input indicative to transition from a currently presented slide to a next slide, the next slide being out of the predetermined order of succession, and wherein the display configuration state through which the next slide is to be presented comprises the next display configuration state.

32. An apparatus for controlling a visual presentation of data, the presentation comprising data content and a plurality of display configuration states through which the data content is visualized, the apparatus comprising:

a processor configured to (1) for each pair of potentially successive display configuration states, associate a transition effect therewith, (2) present to the viewer a current display configuration state and data content therefor, (3) receive transition input indicative to transition from the current display configuration state to a next display configuration state, the transition defining a pair of successive display configuration states, (4) responsive to the received transition input (a) present to the viewer the transition effect associated with the defined pair during an interval between the current display configuration state and the next display configuration state, and (b) present to the viewer the next display configuration state and data content therefor after the transition effect has been presented.

33. The apparatus of claim 32 wherein the display configuration states comprise visual display configuration states, wherein the processor is further configured to adjust the presentation's visual display configuration states in response to style guide input that corresponds to a selection of a style guide from a plurality of style guides, each style having associated therewith a plurality of visual display configuration states.

34. The apparatus of claim 33 wherein the processor is part of a presenter computer interconnected with at least one viewer computer via a network, the viewer being stationed at the viewer computer.

35. The apparatus of claim 33 wherein the processor is part of a viewer computer interconnected with a presenter computer via a network, the viewer being stationed at the viewer computer.

36. The apparatus of claim 32 wherein the visual presentation is a multimedia presentation comprising a plurality of slides having a predetermined order of succession for display, each slide comprising a display configuration state and the data content therefor; and
wherein the processor is further configured to display the slides in an order out of the predetermined order of succession in response to input from a user.

37. A computer readable medium for controlling a visual presentation of data, the visual presentation comprising a plurality of display configuration states presented to a viewer computer through which data content is also presented, the computer readable medium comprising:
a plurality of stored display configuration states;
a plurality of stored transition effects;
a code segment executable by a computer for associating each pair of display configuration states that can potentially be presented to the viewer in succession during the visual presentation with a stored transition effect; and
a code segment executable by a computer for presenting the visual presentation, including instructions for, during a transition from a currently presented display configuration state to a next display configuration state, presenting the transition effect associated with the current-next display configuration state pair.

38. The computer readable medium of claim 37 wherein the computer readable medium is a CD-ROM.

39. The computer readable medium of claim 37 wherein the computer readable medium is software stored on a web server accessible by a viewer computer.

40. The computer readable medium of claim 37 wherein the computer readable medium is software stored on a viewer computer.

41. The computer readable medium of claim 37 wherein the computer readable medium is software stored on a presenter computer.

42. The computer readable medium of claim 37 wherein the display configuration states comprise visual display configuration states, the computer-readable medium further comprising:
a plurality of stored style guides, each style guide having a plurality of visual display configuration states and a plurality of transition effects corresponding thereto;
a code segment executable by a computer for associating the visual presentation with a stored style guide, thereby defining that the visual display configuration states and transition effects available for the visual presentation are the visual display configuration states and transitions effects corresponding to the style guide associated with the visual presentation.

43. The computer readable medium of claim 42 further comprising a code segment executable by a computer for selecting which of the stored style guides is associated with the visual presentation in response to user input.

44. The computer readable medium of claim 43 wherein the plurality of transition effects corresponding to each style guide are grouped as a plurality of transition effect sets, the computer readable medium further comprising a code segment executable by a computer for selecting, in response to user input, a transition effect from the plurality of transition effect sets corresponding to the selected style guide, the selected transition effect set defining the transition effects that are available during transitions.

45. The computer readable medium of claim 44 further comprising a code segment executable by a computer for selecting, in response to user input, a transition effect from the plurality of transition effect sets corresponding to the selected style guide on a slide-specific basis.

46. The computer readable medium of claim 44 further comprising a code segment executable by a computer for selecting, in response to user input, a transition effect from the plurality of transition effect sets corresponding to the selected style guide on a global presentation-wide basis.

47. The computer readable medium of claim 43 further comprising:
a code segment executable by a computer for associating, for each style guide, each of its corresponding visual display configuration states with a plurality of counterpart visual display configuration states in the other style guides; and
a code segment executable by a computer for, in response to style guide selection, replacing the presentation's display visual configuration states with their counterparts in the selected style guide.

48. The computer readable medium of claim 37 further comprising a code segment for defining at least one transition from a current display configuration state to a next display configuration state as a transition from a current display configuration state to an intermediate display configuration state and a transition from the intermediate display configuration state to the next display configuration state.

49. The computer readable medium of claim 37 wherein the visual presentation is a multimedia slideshow presentation.

50. The computer readable medium of claim 37 wherein the visual presentation is a videoconference.

51. The computer readable medium of claim 37 wherein the visual presentation is a video phone call.

52. The computer readable medium of claim 49 wherein the multimedia slideshow presentation comprises a plurality of slides not having a predetermined fixed order of succession for display, each slide comprising a display configuration state and data content presented therethrough.

53. A method of controlling a visual presentation of data to a viewer, the presentation comprising a plurality of display configuration states through which data content is presented to the viewer, the method comprising:
providing a plurality of style guides, each style guide having a plurality of visual display configuration states corresponding thereto;
for each style guide, associating each of its corresponding visual display configuration states with a plurality of counterpart visual display configuration states in the other style guides;
for a visual presentation having a previously-defined style guide, selecting a different style guide therefor; and
replacing the visual presentation's display configuration states with their counterparts in the different style guide.

54. The method of claim 53 wherein the presentation further comprises a plurality of transition effects that are displayed during transitions between visual display configuration states, the method further comprising:

delivering the presentation by presenting to the viewer in a sequence the presentation's visual display configuration states along with data content therefor;

for each pair of potentially successive visual display configuration states within the selected style guide, associating a transition effect therewith;

during a transition from a current display configuration state to a next visual display configuration state, presenting the transition effect associated with the current-to-next visual display configuration state pair.

55. The method of claim 54 wherein each style guide has a plurality of transition effect sets corresponding thereto, each transition effect set comprising a plurality of transition effects that are available for presentation, the method further comprising:

selecting a transition effect set from the plurality of transition effect sets corresponding to the selected style guide; and wherein the transition effect associating step comprises, for each pair of potentially successive visual display configuration states within the selected style guide, associating a transition effect within the selected transition effect set therewith.

56. The method of claim 55 wherein the transition effect selecting step comprises selecting a transition effect set from the plurality of transition effect sets corresponding to the selected style guide on a slide-specific basis.

57. The method of claim 55 wherein the transition effect selecting step comprises selecting a transition effect set from the plurality of transition effect sets corresponding to the selected style guide on a global presentation-wide basis.

58. The method of claim 53 wherein the visual presentation is a multimedia presentation comprising a plurality of slides.

59. The method of claim 58 wherein the multimedia presentation is delivered from a presenter computer to at least one viewer computer, the presenter computer and at least one viewer computer being interconnected via a network.

60. The method of claim 53 wherein the visual presentation is a video conference.

61. The method of claim 53 wherein the visual presentation is a video phone call.

62. An apparatus for controlling a visual presentation of data, the presentation having a style guide associated therewith and comprising data content and a plurality of display configuration states through which the data content is visualized, the apparatus comprising:

a processor configured to (1) determine, in response to user input, a new style guide for the visual presentation from a plurality of style guides, each style guide having a plurality of display configuration states corresponding thereto that are available for use during the visual presentation, each style guide further having, for each of its corresponding display configuration states, a plurality of counterpart display configuration states in the other style guides, and (2) replace the display configuration states of the visual presentation with their counterparts in the new style guide.

63. The apparatus of claim 62 wherein the processor is part of a presenter computer interconnected with at least one viewer computer via a network, the viewer being stationed at the viewer computer.

64. The apparatus of claim 62 wherein the processor is part of a viewer computer interconnected with a presenter computer via a network, the viewer being stationed at the viewer computer.

65. A computer readable medium for controlling a visual presentation of data, the presentation comprising a plurality of display configuration states presented to a viewer through which data content is also presented, the computer readable medium comprising:

a plurality of stored visual display configuration states;

a plurality of stored style guides, each style guide having a plurality of the stored visual display configuration states corresponding thereto;

a code segment executable by a computer for associating, for each stored style guide, each of its corresponding visual display configuration states with a plurality of counterpart visual display configuration states in the other style guides;

a code segment for selecting, in response to user input, a new style guide for a presentation having a previously-defined style guide; and a code segment for replacing the presentation's visual display configuration states with their counterparts in the newly selected style guide.

66. The computer readable medium of claim 65 further comprising:

a plurality of stored transition effects;

a code segment for associating each pair of potentially successive visual display configuration states with a stored transition effect; and a code segment for presenting a current visual display configuration state of the presentation to the viewer along with the data content therefor;

a code segment for determining the transition effect associated with a transition from the current display visual configuration state to a next visual display configuration state; and a code segment for presenting the determined transition effect to the viewer prior to presenting the next visual display configuration state.

67. The computer readable medium of claim 65 wherein the computer readable medium is a CD-ROM.

68. The computer readable medium of claim 65 wherein the computer readable medium is software stored on a web server accessible by a viewer computer.

69. The computer readable medium of claim 65 wherein the computer readable medium is software stored on a viewer computer.

70. The computer readable medium of claim 65 wherein the computer readable medium is software stored on a presenter computer.

71. The computer readable medium of claim 65 wherein the visual presentation is a multimedia slideshow presentation.

72. The computer readable medium of claim 65 wherein the visual presentation is a videoconference.

73. The computer readable medium of claim 65 wherein the visual presentation is a video phone call.

74. A method of controlling the style of a visual presentation of data, the presentation comprising a plurality of successively presented visual display configuration states through which data content is presented to a viewer, the method comprising:

providing a plurality of style guides, each style guide having a plurality of visual display configuration states corresponding thereto that are available for presenting to the viewer and a plurality of transition effect sets corresponding thereto, each transition effect set comprising a plurality of transition effects that are available for presenting to the viewer during transitions between successively presented visual display configuration states;

selecting a style guide for the presentation, thereby defining the visual display configuration states that are available for presenting to the viewer and the transition effect sets that are available;

selecting a transition effect set from the plurality of transition effect sets corresponding to the selected style guide, thereby defining the transition effects that are available for presenting the viewer.

75. The method of claim 74 wherein the presentation comprises a plurality of slides, each slide having a corresponding visual display configuration state and data content presented therethrough, the method further comprising associating an available transition effect with each succession of slides in the presentation, and wherein the transition effect selecting step comprises selecting a transition effect set from the plurality of transition effect sets corresponding to the selected style guide on a slide-specific basis.

76. The method of claim 74 wherein the presentation comprises a plurality of slides, each slide having a corresponding visual display configuration state and data content presented therethrough, the method further comprising associating an available transition effect with each succession of slides in the presentation, and wherein the transition effect selecting step comprises selecting a transition effect set from the plurality of transition effect sets corresponding to the selected style guide on a global presentation-wide basis.

77. With a visual presentation of data comprising a plurality of slides that are successively presented to a viewer, a method for transitioning from a presented slide to a next successive slide, the method comprising:

maintaining a matrix that associates a transition effect with each possible transition from a currently presented slide to a next successive slide;

displaying a current slide;

determining a next successive slide for display;

accessing the matrix to determine the transition effect that is associated with a transition from the displayed current slide to the determined next successive slide; and displaying the determined transition effect prior to displaying the determined next successive slide.

78. The method of claim 77 wherein the slides of the presentation do not have a predetermined fixed order of succession.

79. The method of claim 78 wherein the slides of the presentation are capable of being presented in any order.

80. The method of claim 77 wherein the transition effect includes a video frame.

81. The method of claim 77 wherein the transition effect is animated.

* * * * *